(12) United States Patent
Arita et al.

(10) Patent No.: US 9,672,793 B2
(45) Date of Patent: *Jun. 6, 2017

(54) MAP DISPLAY DEVICE AND MAP DISPLAY METHOD

(75) Inventors: Hidekazu Arita, Tokyo (JP); Mitsuo Shimotani, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 273 days.

This patent is subject to a terminal disclaimer.

(21) Appl. No.: 14/352,047

(22) PCT Filed: Jan. 12, 2012

(86) PCT No.: PCT/JP2012/050514
§ 371 (c)(1),
(2), (4) Date: Apr. 15, 2014

(87) PCT Pub. No.: WO2013/105254
PCT Pub. Date: Jul. 18, 2013

(65) Prior Publication Data
US 2014/0240348 A1    Aug. 28, 2014

(51) Int. Cl.
*G09G 5/377* (2006.01)
*G06F 3/0488* (2013.01)
(Continued)

(52) U.S. Cl.
CPC .......... *G09G 5/377* (2013.01); *G01C 21/367* (2013.01); *G01C 21/3664* (2013.01);
(Continued)

(58) Field of Classification Search
CPC .... G06F 3/0484; G06F 3/0481; G06F 3/0488; G06F 17/30241; G06F 3/048; G06F 3/04847
See application file for complete search history.

(56) References Cited

U.S. PATENT DOCUMENTS 4,194,305 A * 3/1980 Smith .................... G09B 29/02
                                                              434/150
8,489,641 B1 * 7/2013 Seefeld ............ G06F 17/30241
                                                              707/792
(Continued)

FOREIGN PATENT DOCUMENTS

CN         102016501 A        4/2011
CN         102197278 A        9/2011
(Continued)

OTHER PUBLICATIONS

Notification of Reason(s) for Refusal issued for JP2013-553153 dispatched on Mar. 4, 2014.

*Primary Examiner* — Jacinta M Crawford
*Assistant Examiner* — Phuc Doan
(74) *Attorney, Agent, or Firm* — Birch, Stewart, Kolasch & Birch, LLP

(57) ABSTRACT

An object of the present invention is to provide a map display device and a map display method for displaying a plurality of map drawing pictures so as to improve convenience for a user. The map display device according to the present invention includes an input/display unit that receives input of user operation and displaying a first drawing object related to map information in a first drawing picture and a second drawing object related to map information in a second drawing picture; and a controller for controlling an overlapping state between the first drawing picture and a partial area of the second drawing picture in accordance with input of user operation received by the input/display unit and outputting, to the input/display unit, a picture in which the second drawing object masks the first drawing object in such an overlapped portion.

4 Claims, 24 Drawing Sheets

(51) Int. Cl.
*G01C 21/36* (2006.01)
*G09B 29/10* (2006.01)
*G06T 11/20* (2006.01)

(52) U.S. Cl.
CPC .......... *G06T 11/203* (2013.01); *G09B 29/106* (2013.01); *G06F 3/0488* (2013.01)

(56) References Cited

U.S. PATENT DOCUMENTS

| | | | | |
|---|---|---|---|---|
| 2006/0125799 | A1* | 6/2006 | Hillis | G06F 3/011 345/173 |
| 2006/0284852 | A1* | 12/2006 | Hofmeister | G06F 3/0483 345/173 |
| 2009/0024319 | A1* | 1/2009 | Tsuji | G01C 21/3673 701/533 |
| 2010/0198501 | A1* | 8/2010 | Otani | G01C 21/3632 701/533 |

FOREIGN PATENT DOCUMENTS

| | | |
|---|---|---|
| JP | 6-301505 A | 10/1994 |
| JP | 2001-174271 A | 6/2001 |
| JP | 2002-296046 A | 10/2002 |
| JP | 2008-83108 A | 4/2008 |
| JP | 2010-190593 A | 9/2010 |
| JP | 2011-002801 A | 1/2011 |
| JP | 2011-38970 A | 2/2011 |

\* cited by examiner

F I G . 2 5
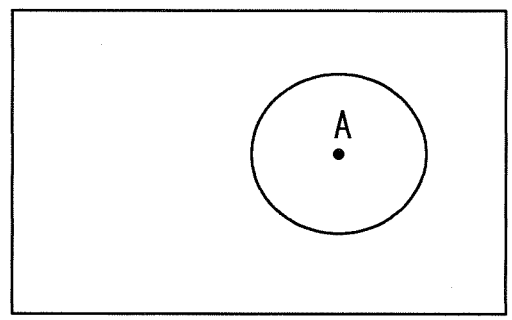

MAP DISPLAY DEVICE AND MAP DISPLAY METHOD

TECHNICAL FIELD

The present invention relates to a map display device and a map display method, and particularly relates to a map display device and a map display method for simultaneously displaying a plurality of information drawing pictures on a display screen.

BACKGROUND ART

In an exemplary map display method of displaying a plurality of map drawing pictures on a display screen, the display screen is divided into two regions and a map drawing picture around a current position of a vehicle or the like is displayed in each of the regions (see Patent Document 1). The map drawing picture herein is a picture including a drawing object related to map display. The drawing object includes a road line, a character, topography, a building, an icon, a background color (including a transparent or a translucent color), associated information, or the like. The display screen is a display for actually displaying a map drawing picture. The map drawing picture is displayed in a predetermined display region in the display screen.

According to this map display method, one of the display regions includes a map drawing picture related to route guide and the other one of the display regions includes a map drawing picture related to similar route guide on a different scale. The map display method is thus useful for a user.

According to the map display method of Patent Document 1, the boundary between the right and left display regions is shiftable, and the displayed maps are displaced in accordance with shift of the boundary. This configuration fixes a content displayed at the center before and after the shift of the boundary, thereby to enhance convenience.

PRIOR ART DOCUMENT

Patent Document

Patent Document 1: Japanese Patent Application Laid-Open No. 2001-174271

SUMMARY OF INVENTION

Problems to be Solved by the Invention

There has been a problem that it is not always easy to comprehend relevance between the drawing objects displayed respectively in the plurality of map drawing pictures that are displayed simultaneously in accordance with the map display method mentioned above.

For example, in a case where, out of the map drawing pictures indicating the current position of the vehicle, one includes expressways and the other one includes ordinary roads, or in a case where one of the map drawing pictures is a planar map drawing picture and the other one is a relief map drawing picture, a user has been required to compare display regions and determine in accordance with a landmark building or the like in order to comprehend how pieces of map information in the map drawing pictures respectively displayed in these display regions correspond to each other.

The present invention has been achieved to solve the above problems, and an object of the present invention is to provide a map display device and a map display method for simultaneously displaying a plurality of information drawing pictures. The device and the method therefor can facilitate comprehending relevance between drawing objects included respectively in the plurality of information drawing pictures.

Means for Solving the Problems

A map display device according to the present invention is capable of displaying a plurality of drawing pictures including a first drawing picture and a second drawing picture in an at least partially overlapping manner. The first drawing picture displays at least one first drawing object, the second drawing picture displays at least one second drawing object, at least one of the first and second drawing pictures includes a drawing object related to map information, and the first and second drawing pictures are equal or different in size. The map display device according to the present invention includes: an input unit that receives input of user operation related to display of a drawing picture; and a controller for controlling an overlapping state between the first drawing picture and a partial area in the second drawing picture in accordance with input of user operation received by the input unit and outputting, to a display unit, a picture in which the second drawing object masks the first drawing object in a portion where the first drawing picture and the partial area in the second drawing picture are overlapped with each other.

A map display method according to the present invention is for displaying a plurality of drawing pictures including a first drawing picture and a second drawing picture in an at least partially overlapping manner. The first drawing picture displays at least one first drawing object, the second drawing picture displays at least one second drawing object, at least one of the first and second drawing objects includes a drawing object related to map information, and the first and second drawing pictures are equal or different in size. The map display method according to the present invention includes the steps of (a) receiving input of user operation related to display of a drawing picture, (b) displaying the plurality of drawing pictures, and (c) prior to the step (b), controlling an overlapping state between the first drawing picture and a partial area in the second drawing picture in accordance with input of user operation received in the step (a), and masking the first drawing object with the second drawing object in a portion where the first drawing picture and the partial area in the second drawing picture are overlapped with each other.

Effects of the Invention

A map display device according to the present invention includes: an input unit that receives input of user operation related to display of a drawing picture; and a controller for controlling an overlapping state between the first drawing picture and a partial area in the second drawing picture in accordance with input of user operation received by the input unit and outputting, to a display unit, a picture in which the second drawing object masks the first drawing object in a portion where the first drawing picture and the partial area in the second drawing picture are overlapped with each other. This configuration achieves map display of fine usability for a user.

The map display method according to the present invention includes the steps of (a) receiving input of user operation related to display of a drawing picture, (b) displaying the plurality of drawing pictures, and (c) prior to the step (b), controlling an overlapping state between the first drawing picture and a partial area in the second drawing picture in accordance with input of user operation received in the step (a), and masking the first drawing object with the second drawing object in a portion where the first drawing picture and the partial area in the second drawing picture are overlapped with each other. This configuration achieves map display of fine usability for a user.

The objects, features, aspects, and advantages of the present invention will be made more obvious with reference to the following detailed description and the accompanying drawings.

BRIEF DESCRIPTION OF DRAWINGS

FIG. 25 is a view illustrating behavior of the map display device.

DESCRIPTION OF EMBODIMENTS

Embodiment 1

Configuration

A conceptual entire configuration of a map display device according to an embodiment 1 is described with reference to FIG. 1. Although the map display device is not particularly limited in terms of its purpose of use, the map display device according to the following embodiment described below is assumed to be a car navigation system equipped on a vehicle as a mobile body.

Figure 1:
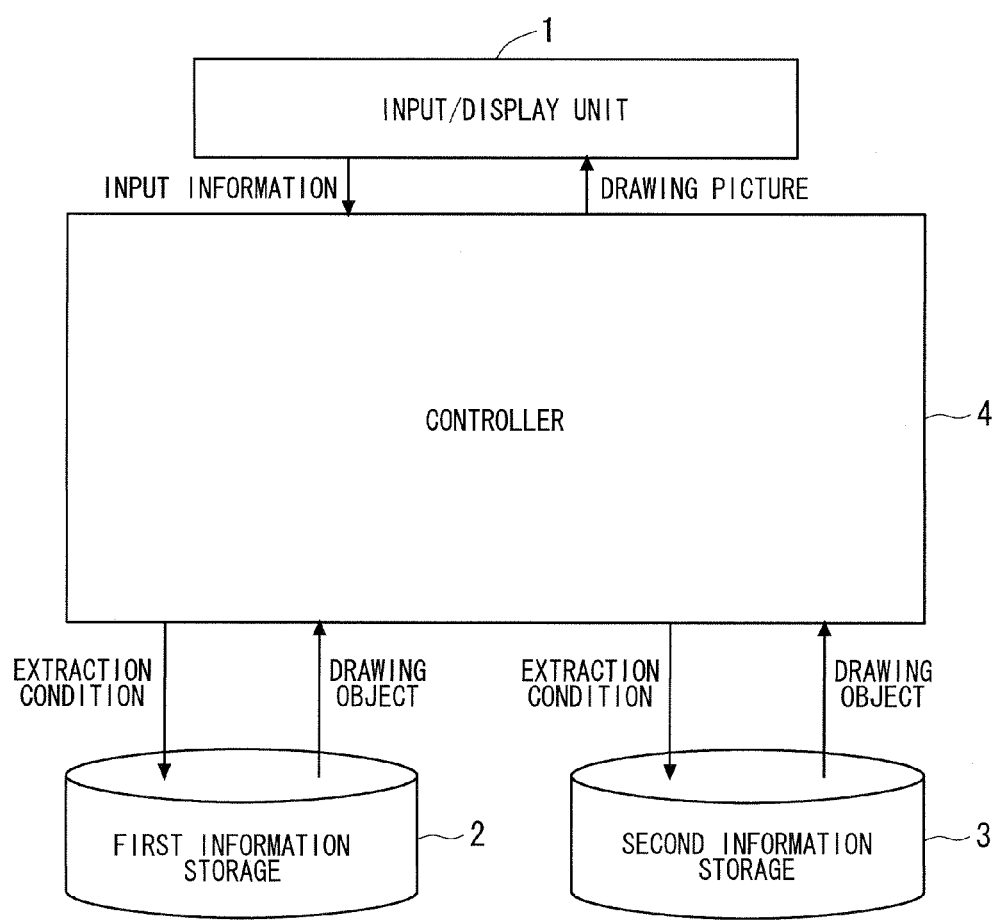
FIG. 1 is a view showing a conceptual entire configuration of a map display device.

As shown in FIG. 1, the map display device includes an input/display unit 1, a controller 4, a first information storage 2, and a second information storage 3. The input/display unit 1 functions as both an input unit that receives input of user operation related to display on a screen and a display unit that displays a plurality of drawing pictures on the screen. The controller 4 controls display behavior of a map drawing picture in accordance with input of user operation received by the input/display unit 1. The first information storage 2 and the second information storage 3 each store a drawing object and the like to be referred to upon behavior control by the controller 4.

The drawing object is displayed in a drawing picture and includes a road line, a character, topography, a building, an icon, a background color (possibly a transparent or translucent color), associated information, or the like. The background color included in the drawing object (a background drawing object) is not necessarily painted uniformly but can have gradation or can be painted partially in a drawing picture.

The input/display unit 1 is specifically embodied by a touch panel (a display device including a touch panel) or the like. The touch panel receives user's contact (touch) on a display screen and analyzes a touched position, a motion, and the like on the display screen to comprehend user's intention. Expected user's intention can be operation on a displayed map, a route search command, operation on built-in audio equipment, or the like. Examples of such map operation include changing a scale, changing a display position on a map (scrolling), searching for information on a current position and its periphery, and comparing the information.

The first information storage 2 and the second information storage 3 each store a drawing object related to map information or the like. More specifically, the first information storage 2 and the second information storage 3 each store map data on topography or the like, road data associated with a corresponding position on the map, building data (a figure and a shape), background color data, or the like. The building data includes a three-dimensional shape, a type, a name, and the like of the building itself. The information stored in each of the first information storage 2 and the second information storage 3 is not limited to such a drawing object related to map information, but each of the first information storage 2 and the second information storage 3 can store any other drawing object to be displayed at the input/display unit 1.

Each of the first information storage 2 and the second information storage 3 is specifically embodied by a hard disk drive, a memory card, a DVD, a Blu-ray Disc, or the like.

The controller 4 controls each functional unit included in the map display device and causes the input/display unit 1 to display a map drawing picture or the like. As shown in FIG. 1, the controller 4 analyzes user input information to form an extraction condition that relates to a drawing object and is necessary for formation of a map drawing picture. In a case where the controller 4 analyzes input information to comprehend user's intention of "search for peripheral expressway information", the controller 4 forms a condition for extracting a drawing object of ordinary roads around the current position and a drawing object of expressways around the current position.

The controller 4 further extracts a corresponding drawing object from each of the first information storage 2 and the second information storage 3 under the extraction condition, and causes the input/display unit 1 to display each of the extracted drawing objects in a desired mode. The controller 4 is specifically embodied by a computer (CPU) and a program thereof.

Figure 2:
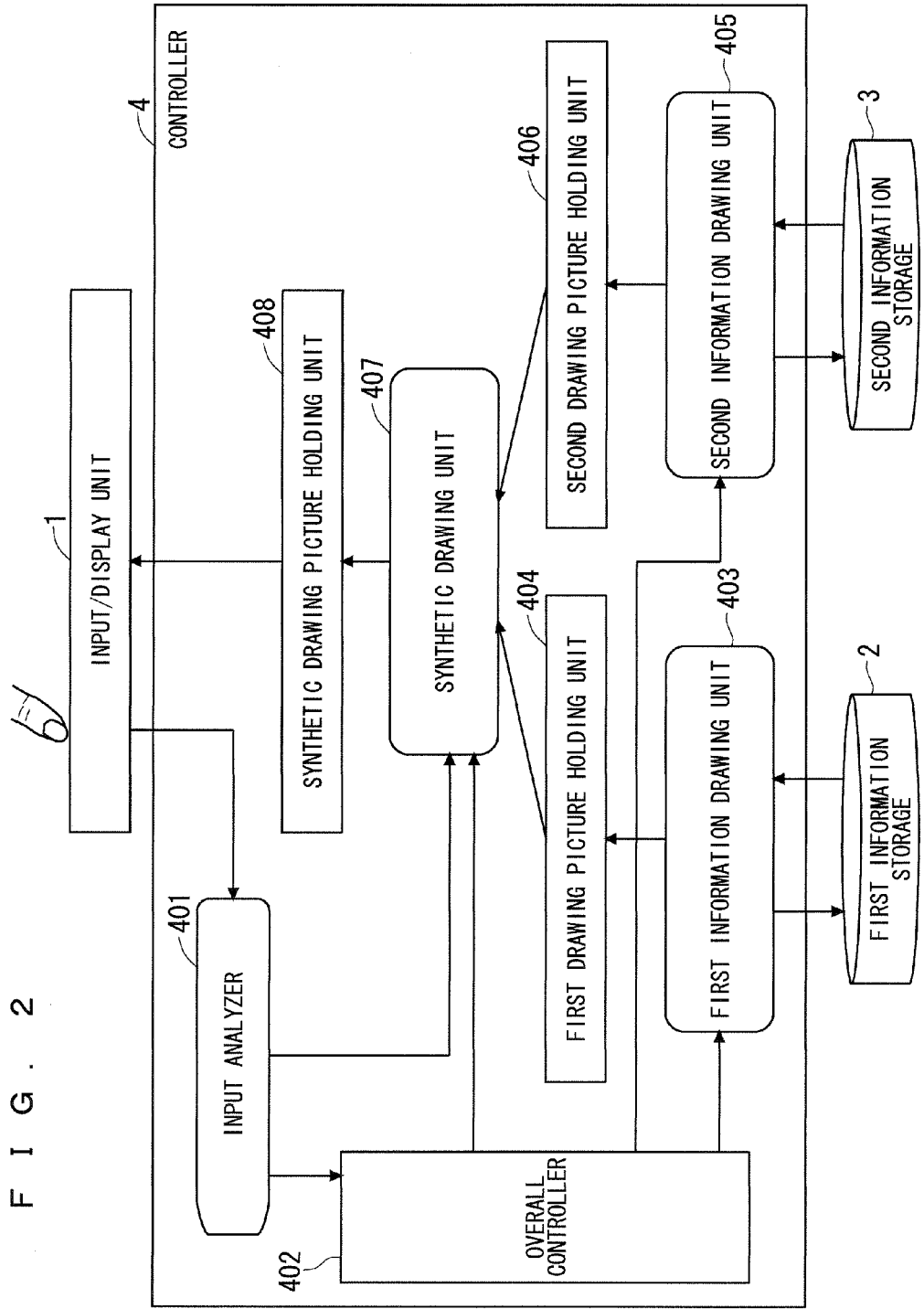
FIG. 2 is a view showing a conceptual configuration of a controller in the map display device.

FIG. 2 particularly illustrates a detailed conceptual configuration of the controller 4 in the configuration of the map display device shown in FIG. 1.

The controller 4 includes an input analyzer 401, an overall controller 402, a first information drawing unit 403, a second information drawing unit 405, a first drawing picture holding unit 404, a second drawing picture holding unit 406, a synthetic drawing unit 407, and a synthetic drawing picture holding unit 408. The input analyzer 401 analyzes input information from the input/display unit 1. The overall controller 402 controls the first information drawing unit 403, the second information drawing unit 405, and the synthetic drawing unit 407 in accordance with a result of the analysis by the input analyzer 401, and causes the input/display unit 1 to display a map drawing picture or the like. The first information drawing unit 403 extracts a first drawing object as a drawing object stored in the first information storage 2 and draws, at the first drawing picture holding unit 404, a first drawing picture as a drawing picture including the first drawing object. The second information drawing unit 405 extracts a second drawing object as a drawing object stored in the second information storage 3 and draws, at the second drawing picture holding unit 406, a second drawing picture as a drawing picture including the second drawing object. The first drawing picture holding unit 404 holds the first drawing picture. The second drawing picture holding unit 406 holds the second drawing picture. The synthetic drawing unit 407 draws, at the synthetic drawing picture holding unit 408, a synthetic drawing picture from the first drawing picture and the second drawing picture. The synthetic drawing picture holding unit 408 holds the synthetic drawing picture formed by the synthetic drawing unit 407. The input/display unit 1 displays the synthetic drawing picture held in the synthetic drawing picture holding unit 408.

The input analyzer 401 analyzes input information according to user's intention. More specifically, the input analyzer 401 analyzes a content displayed in a drawing picture and conditions such as a position touched on the display screen by a user and a motion, and identifies operation (e.g. equipment operation) according to the user's intention. User operation on the touch panel includes conventional simple touch operation of simply touching an icon (ordinary touch operation), or dynamic "gesture operation" such as "drag operation" or "flick operation" to be described later.

The overall controller 402 specifies a necessary drawing object on the basis of the analysis result, causes the first information drawing unit 403 to extract the first drawing object from the first information storage 2, and causes the second information drawing unit 405 to extract the second drawing object from the second information storage 3.

The first information drawing unit 403 forms a first drawing picture from the extracted first drawing object, and draws the first drawing picture at the first drawing picture holding unit 404 (memory unit). The first drawing picture is drawn by combining map data, road data, building data, and the like in the extracted first drawing object.

The second information drawing unit 405 forms a second drawing picture from the extracted second drawing object, and draws the second drawing picture at the second drawing picture holding unit 406 (memory unit). The second drawing picture is drawn by combining map data, road data, building data, and the like in the extracted second drawing object.

Each of the first information drawing unit 403 and the second information drawing unit 405 is capable of adding, to the corresponding map drawing picture (the first drawing picture or the second drawing picture) thus formed, information generated in the device such as vehicle current position data or route data to a destination of the vehicle obtained by route search behavior, so as to draw at the corresponding drawing picture holding unit.

The overall controller 402 further causes the synthetic drawing unit 407 to synthesize the first drawing picture held in the first drawing picture holding unit 404 and the second drawing picture held in the second drawing picture holding unit 406 and draw at the synthetic drawing picture holding unit 408 (memory unit). A synthetic drawing picture is held in the synthetic drawing picture holding unit 408 and is then displayed at the input/display unit 1.

The synthetic drawing unit 407 forms the synthetic drawing picture by synthesizing the first drawing picture and the second drawing picture so as to be entirely or partially overlapped with each other while holding drawing contents of the first drawing picture and the second drawing picture. In a portion where the first drawing picture and the second drawing picture are overlapped with each other, a drawing object in an upper drawing picture of the overlapped portion masks a drawing object in a lower drawing picture so that only the upper drawing object is visible. The drawing object in the lower drawing picture can be made visible by controlling an overlapping state between the drawing pictures to cancel the overlap. The "upper/lower" herein corresponds to the upper/lower direction along the normal line of a display screen and a closer side corresponds to the "upper" side. In fact, pieces of drawing picture data are overlapped conceptually.

The first drawing picture and the second drawing picture to be synthesized can alternatively have a first attention point and a second attention point, respectively.

The first attention point and the second attention point are particularly paid attention in the drawing pictures by a user, and are subjectively defined as points to be compared when the user refers to both the first drawing picture and the second drawing picture. Such points can be targets of drawing pictures to be formed, such as a current position of a vehicle on a peripheral map of the vehicle or a position of a destination on a peripheral map of the destination.

The first drawing object and the second drawing object can have predetermined relevance therebetween. Such predetermined relevance can be established in a case where the first drawing picture displays a map in a predetermined geographical range and the second drawing picture displays a map in a geographical range identical with or in the vicinity of that of the first drawing picture. There is also relevance on a travel route in a case where the first drawing picture displays the periphery of its own car and the second drawing picture displays a route to a destination. There is further temporal relevance such as a current travel route and a past travel record of an identical vehicle.

The order of overlapping map drawing pictures can be decided in accordance with user's intention, e.g. for each combination of drawing objects. It is possible to comprehend more easily if the order is displayed in the up-down relationship according to the actual spatial disposition. For example, a drawing picture displaying elevated roads is overlapped on a drawing picture displaying ordinary roads. A drawing picture displaying a ground map is overlapped on a drawing picture displaying an underground map. It is noted that the overlapping order can be changeable at any time.

Basic Behavior

Behavior of the map display device according to the embodiment 1 is briefly described next.

The map display device according to the present invention is capable of displaying a plurality of overlapped map drawing pictures. The overlapping state between the map drawing pictures is updated so as to reflect user operation. The user is thus capable of comparing a drawing object in an upper map drawing picture and a drawing object in a lower map drawing picture so as to easily comprehend relevance therebetween. The controller 4, particularly the overall controller 402, controls each functional unit during the behavior.

The following description adopts a sliding method as a specific method of performing predetermined operation of updating a display position in the upper overlapped map drawing picture. In the sliding method to be described below, a display position in a drawing picture is shifted successively.

Figure 3:
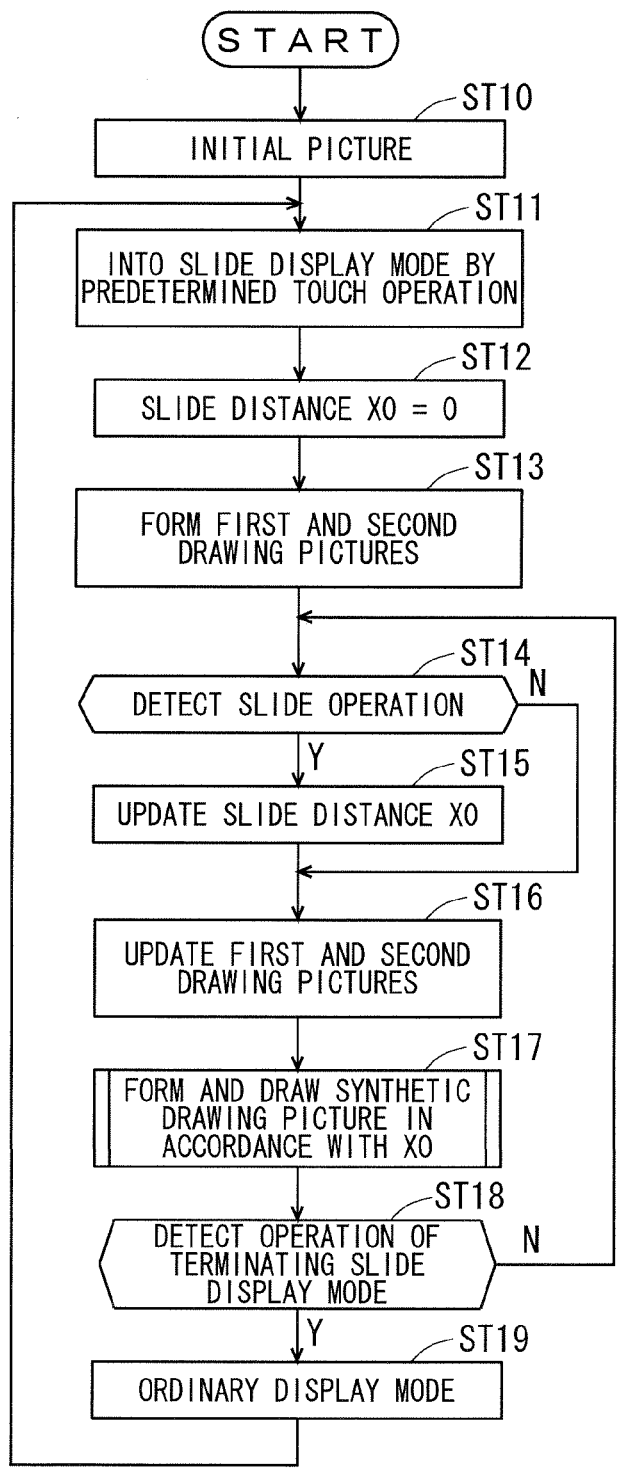
FIG. 3 is a flowchart illustrating behavior of the map display device.

Specific behavior of the map display device is described with reference to FIG. 3.

Initially in step ST10, the map display device is turned on so as to cause the input/display unit 1 to display an initial picture. The initial picture is in an ordinary display mode of receiving ordinary touch operation.

Then in step ST11, a user performs predetermined operation on the initial picture displayed by the input/display unit 1 so as to transition into a slide display mode. In the slide display mode, a user is capable of sliding the upper map drawing picture by performing gesture operation to the input/display unit 1. The display mode is changed by touch operation, button operation, icon operation, gesture operation, voice input, or the like.

The overall controller 402 stores a parameter including a type of the display mode. Reference to the parameter enables determining whether or not the slide display mode is selected. For example, whether or not the slide display mode is selected is determined on the basis of the fact that the parameter has a value larger or smaller than a predetermined threshold. The parameter can be set by user operation such as icon operation or voice input, or can be changed automatically depending on preset conditions (including a state of a vehicle and a display state on the display screen). Still alternatively, an icon or the like can be displayed on the display screen of the input/display unit 1, so that a user is capable of visually recognizing whether or not the slide display mode is selected.

When the display mode transitions to the slide display mode, a slide distance X0 is set to zero in step ST12.

Then in step ST13, a first drawing picture and a second drawing picture are formed. The first information drawing unit 403 and the second information drawing unit 405 form the pictures in accordance with user input information as described above. The first and second drawing pictures thus formed are drawn and held in the first drawing picture holding unit 404 and the second drawing picture holding unit 406, respectively.

Subsequently in step ST14, it is detected whether or not slide operation of updating the display position in the upper overlapped map drawing picture is performed. The input analyzer 401 analyzes user's gesture operation at the input/display unit 1 to detect slide operation.

Then in step ST15, the slide distance X0 is updated in accordance with the slide operation.

Subsequently in step ST16, the drawing object displayed in each of the first drawing picture and the second drawing picture is updated. This update corresponds to information changing every moment, such as a displayed content varied in accordance with travel of the vehicle or traffic jam information.

Subsequently in step ST17, a display position of the upper overlapped map drawing picture is decided on the basis of the slide distance X0, and a synthetic drawing picture is formed from the first drawing picture and the second drawing picture. The synthetic drawing picture is drawn, in other words, displayed, at the input/display unit 1. Details thereof are to be described later.

Then in step ST18, the overall controller 402 determines whether or not the input analyzer 401 has detected predetermined operation of terminating the slide display mode. The process proceeds to step ST19 if the operation has been detected. In contrast, the process returns to step ST14 if the operation has not been detected. The slide display mode can be terminated by touch operation, button operation, icon operation, gesture operation, voice recognition, or the like.

The display mode then transitions to the ordinary display mode in step ST19, and the process returns to step ST11.

Board slide

Details of step ST17 executed by the synthetic drawing unit 407 are described next with reference to FIGS. 4 to 7. A synthetic drawing picture is formed in this step. Described herein is formation in a case where the second drawing picture is slid out by means of board slide from a state where the second drawing picture is overlapped entirely on the first drawing picture (entirely overlapped state). Board slide is of a sliding type in which a drawing object shifts in a slide direction in association with sliding of a drawing picture. Sliding out is a motion of an upper drawing picture that shifts to the outside of the display screen from a state where drawing pictures are overlapped with each other. Complete sliding out is a slide out motion in a state where a drawing picture shifts so as to be located completely outside the display screen. Such complete sliding out is also called a completely displaced state, in view of the fact that any part of the drawing picture is not overlapped with the other drawing picture.

It is assumed that the second map drawing picture is located above and the first map drawing picture is located below throughout the present description. This positional relationship can be inverted.

Figure 4:
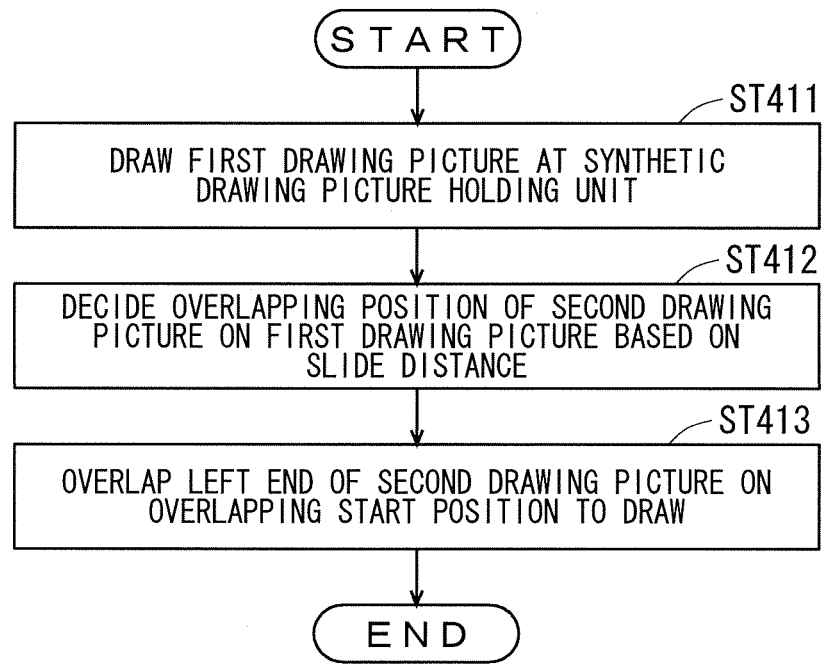
FIG. 4 is a flowchart illustrating behavior of the map display device.

Initially in step ST411 in FIG. 4, the first drawing picture held in the first drawing picture holding unit 404 is drawn at the synthetic drawing picture holding unit 408.

Figure 5:
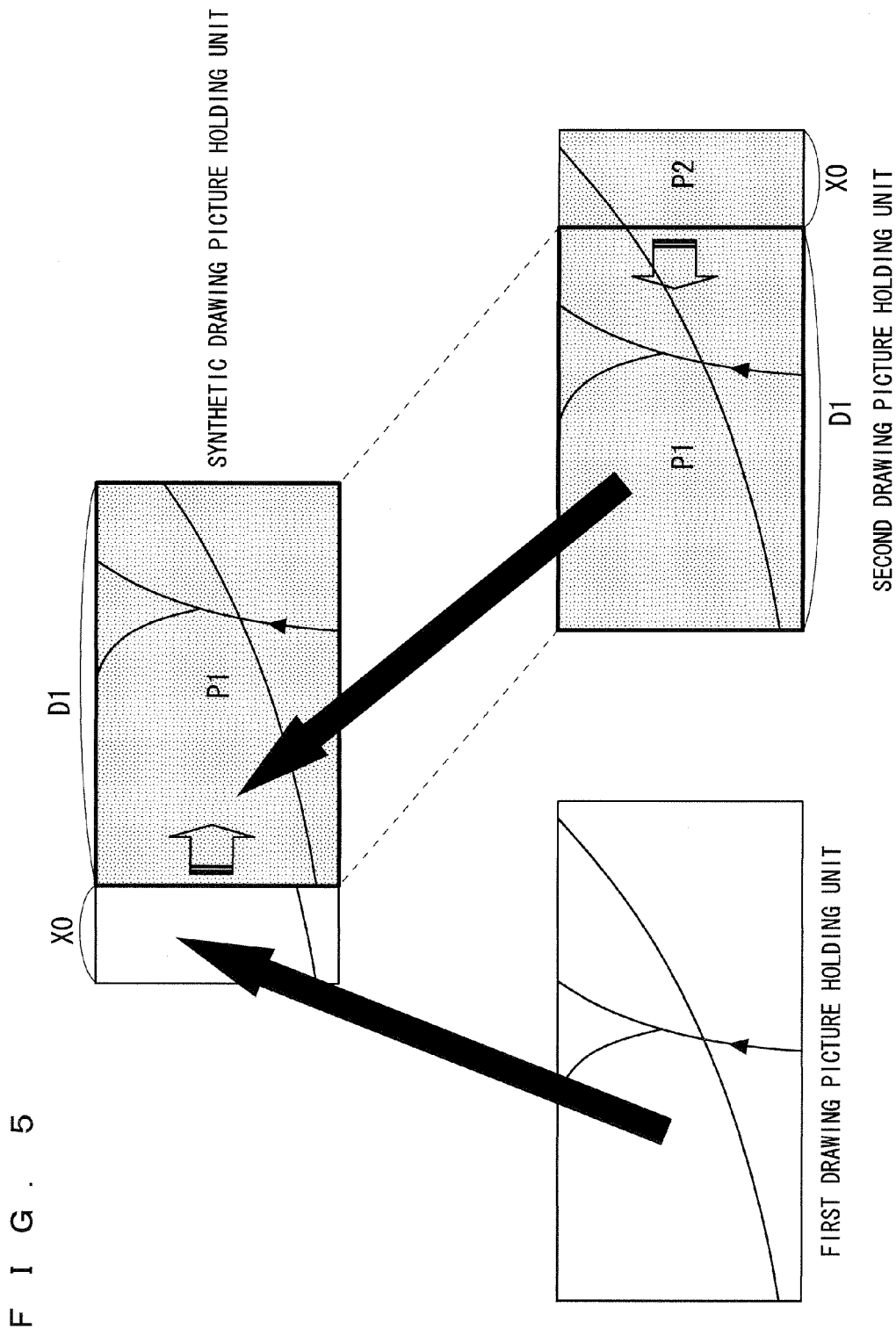
FIG. 5 is a view illustrating behavior of the map display device.
Figure 6:
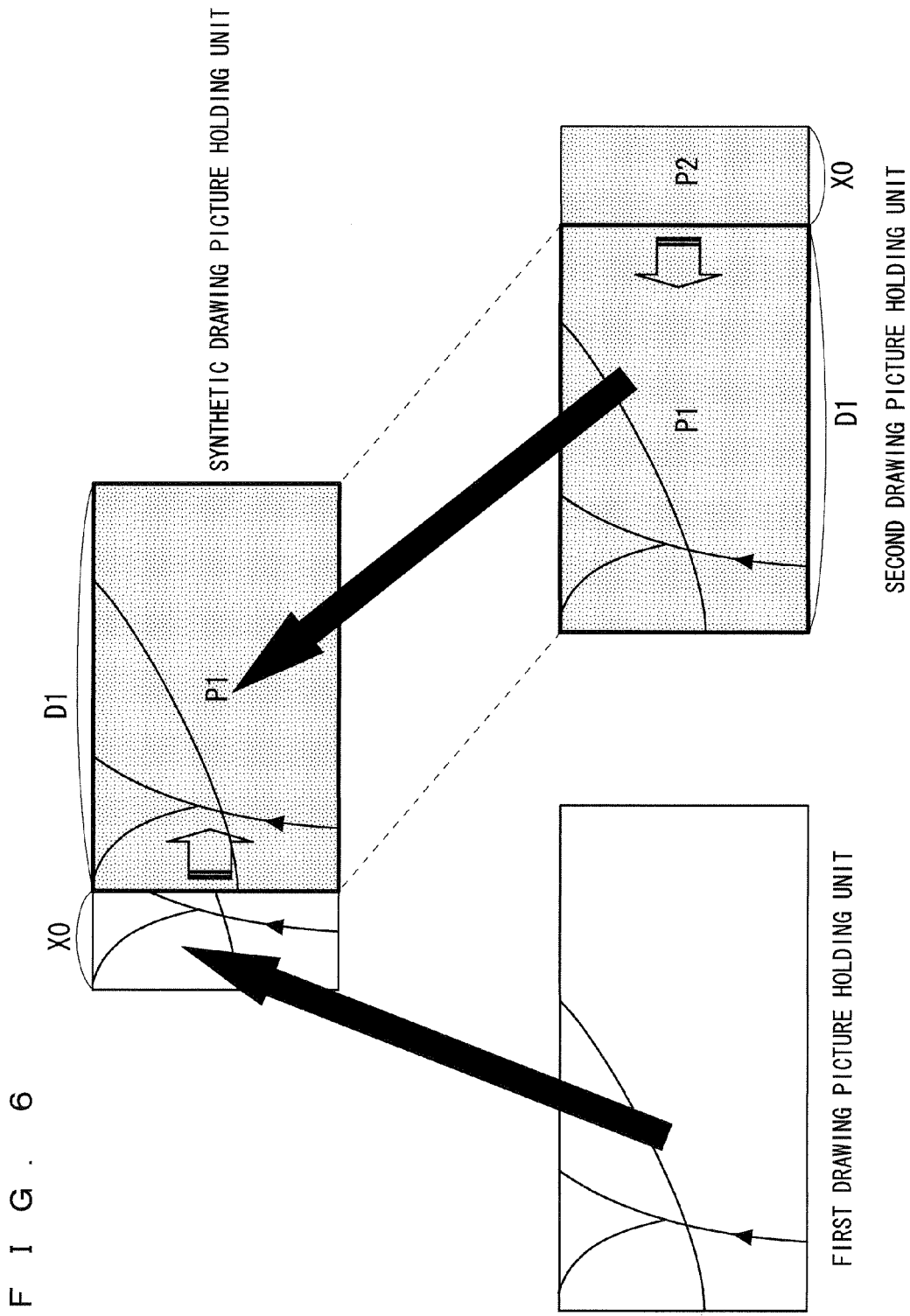
FIG. 6 is a view illustrating behavior of the map display device.

Subsequently in step ST412, an overlapping position of the second drawing picture on the first drawing picture is decided on the basis of the slide distance X0 updated in accordance with slide operation. FIGS. 5 and 6 schematically illustrate methods of synthesizing drawing pictures in cases where drawing objects are displayed at different positions in the drawing pictures.

If the slide distance X0 is zero, the first drawing picture and the second drawing picture are completely overlapped with each other and the second drawing object is positioned to completely mask the first drawing object. If attention points are set, the first drawing picture and the second drawing picture are preferably positioned so that a first attention point in the first drawing picture is overlapped and coincides with a second attention point in the second drawing picture on the display screen. In other words, when the first drawing picture and the second drawing picture each display a peripheral map of the vehicle, these drawing pictures are preferably located so that the current positions of the vehicle in these drawing pictures coincide with each other (the first attention point and the second attention point are located at a common position on the display screen in this case).

If the slide distance X0 is updated to a value other than zero, the overlapping position of the second drawing picture on the first drawing picture is decided on the basis of a position on the display screen touched in user's gesture operation or the like and the slide distance X0 corresponding to the motion.

Examples of user's gesture operation of updating the slide distance X0 include drag operation, shutter operation, and flick operation.

Drag operation is performed by user's gesture operation of shifting in a predetermined direction a finger touched on the display screen without releasing. In this case, the drawing picture is shifted along with this gesture operation. When a user performs such drag operation, the overlapping position of the second drawing picture on the first drawing picture is shifted in a finger shift direction by a shift distance (the slide distance X0 in FIGS. 5 and 6) of the finger. When the finger is dragged rightward, a position distant by the slide distance X0 from the left end of the first drawing picture to the right is decided as an overlapping start position. A mode of forming a synthetic drawing picture with drag operation is called a drag mode.

The second drawing picture slid by drag operation in the drag mode stays at the position after the slide until further gesture operation is performed. The second drawing picture can be alternatively returned to the overlapping position prior to drag operation when a user performs the drag operation and then releases a finger from the display screen. The slide operation in this case is called shutter operation so as to be distinguished from drag operation. A mode of forming a synthetic drawing picture with shutter operation is called a shutter mode.

In which one of the drag mode and the shutter mode slide operation is performed can be set by user's preliminary selection of an icon or the like, or can be distinguished by the input analyzer 401 that detects the number of fingers touching the display screen, variation in finger pressure, or the like.

Flick operation is performed by a motion like flicking a playing card with a finger touching the display screen (a motion like flipping). When a user performs such flick operation, the overlapping position of the second drawing picture on the first drawing picture is displaced in a direction of the flick operation by a distance corresponding to the flick operation. When the finger is dragged rightward, a position distant by the slide distance X0 from the left end of the first drawing picture to the right is decided as an overlapping start position. The slide distance X0 (see FIGS. 5 and 6) is an amount increasing along with time unlike in the drag mode. In this case, the second drawing picture is slid rightward and is completely slid out in the end. Such operation of shifting an upper overlapped drawing picture in a designated direction with predetermined touch operation and then shifting in accordance with predetermined inertia is called flick operation, and a mode of performing this operation is called a flick mode.

In the flick mode, flick operation is determined on the basis of any of the following conditions or by combination thereof, for example. (a) When a finger touches a touch panel and then quickly moves at predetermined or higher speed in a direction on the display screen, (b) when a finger presses the touch panel and then quickly moves with less press force at predetermined or higher speed in a direction on the display screen, or (c) when a finger touches the touch panel, then quickly moves at preliminarily predetermined or higher speed in a direction on the display screen, and is slightly released from the touch panel (in which case the touch panel is required to recognize a three-dimensional position).

The flick operation under the condition (a) is distinguished from drag operation on the basis of finger shift speed. The speed set as predetermined speed in each of the conditions (a) to (c) can be different from each other.

Then in step ST413, the second drawing picture is drawn in a state of being overlapped on the first drawing picture in accordance with the overlapping position, more particularly, the overlapping start position, decided in step ST412 (overwriting data). In a case where the second drawing picture is slid rightward out of the display screen, drawing is executed in the state where the second drawing picture is overlapped so that the left end thereof coincides with the overlapping start position.

A region in the second drawing picture not overlapped on the first drawing picture (P2 in FIGS. 5 and 6) is not displayed on the display screen. More specifically, the display screen displays the first drawing object in the first drawing picture having width equal to the slide distance X0 and not overlapped with the second drawing picture as well as the second drawing object in the second drawing picture having width D1 (except the width equal to the slide distance X0 from the right end) from the left end of the second drawing picture (P1 in FIGS. 5 and 6).

Figure 7:
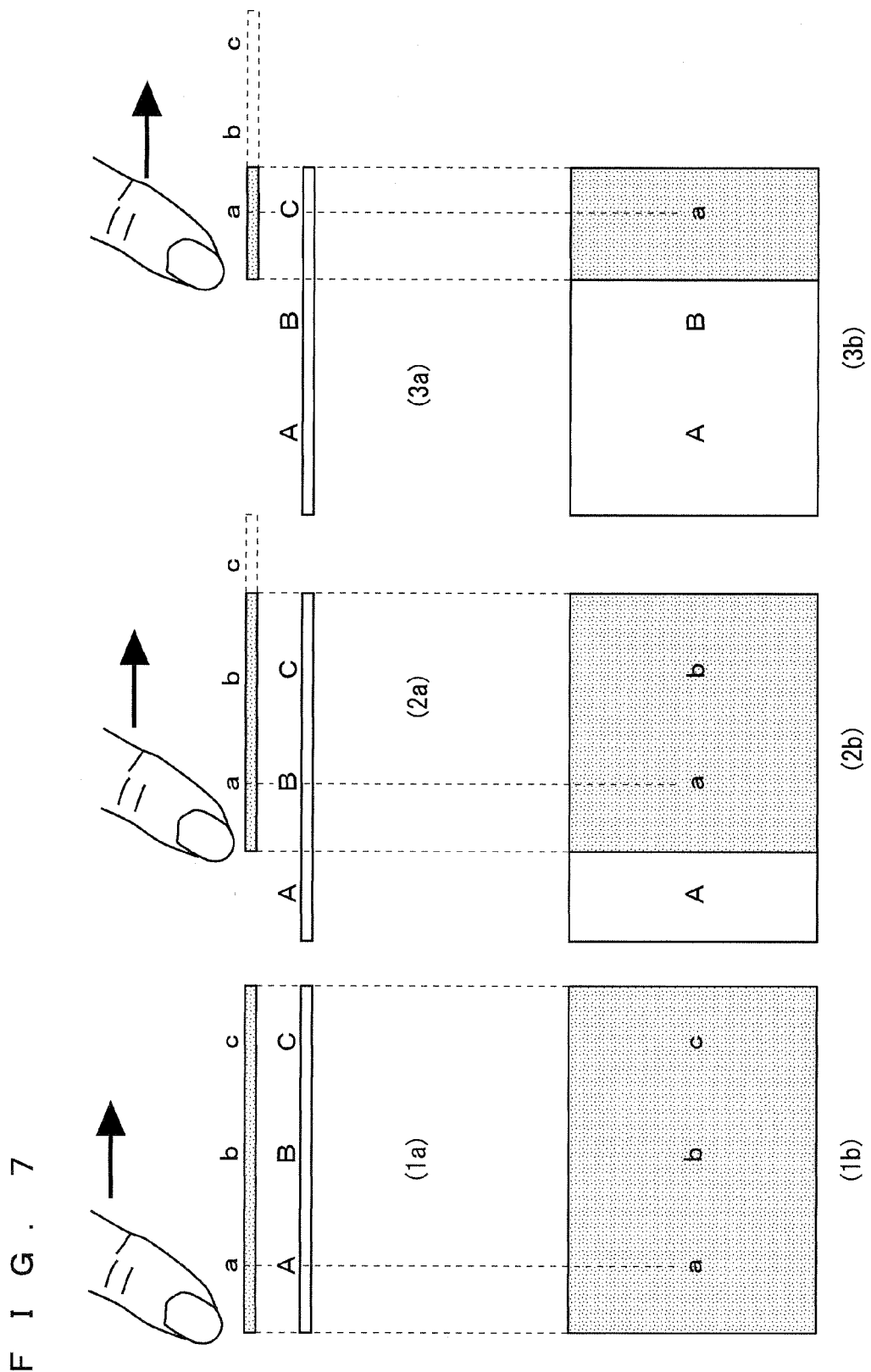
FIG. 7 shows views illustrating behavior of the map display device.

Sequentially forming a synthetic drawing picture as described above enables sliding out by means of board slide shown in FIG. 7. In FIG. 7, a second drawing picture including a drawing object a, a drawing object b, a drawing object c, and a second background drawing object is overlapped on a first drawing picture including a drawing object A, a drawing object B, a drawing object C, and a first background drawing object. It is assumed that the drawing object A is located at a first attention point in the first drawing picture and the drawing object a is located at a second attention point in the second drawing picture. The first background drawing object and the second background drawing object can be rectangular objects being equal in size to the drawing pictures and painted in cream. The drawing object a, the drawing object b, and the drawing object c are drawn on the second background drawing object in the second drawing picture.

In FIG. 7, portions (1a), (2a), and (3a) are pattern views of the lower first drawing picture and the upper second drawing picture seen in a lateral direction, whereas portions (1b), (2b), and (3b) are pattern views of the first drawing picture and the second drawing picture seen from above.

A user touches the input/display unit 1 with a finger and shifts the finger rightward in the figure without releasing (drag operation). In this case, the overlapping start position in the upper second drawing picture is updated sequentially (from 1*a* to 3*a* through 2*a*, or from 1*b* to 3*b* through 2*b*). The second drawing picture is displayed while shifting rightward like being entirely placed on a board and slid. In other words, the drawing objects a, b, and c are shifted rightward like being placed on a board.

In the state of (1*a*) and (1*b*), the first drawing picture and the second drawing picture are completely overlapped with each other and the second background drawing object masks the drawing objects A, B, and C. If the second drawing picture is smaller than the first drawing picture, the second drawing picture has only to be overlapped on a region in the first drawing picture equal in size to the second drawing picture.

In the state of (2*a*) and (2*b*), the drawing object a and the drawing object b are displayed on the display screen of the input/display unit 1, whereas the rightmost drawing object c is out of the display screen and is not displayed. The drawing object A is displayed whereas the drawing objects B and C are masked by the second background drawing object and are not displayed. In a case where attention points are set, the drawing object A serving as a first attention point and the drawing object a serving as a second attention point are displayed close to each other. It is thus possible to easily comprehend the relevance between these drawing objects (see also FIG. 6). Furthermore, relative positional relationship between the upper second drawing picture and the lower first drawing picture is changing continually in this case.

In the state of (3*a*) and (3*b*), the upper second drawing picture shifts further rightward, and the drawing object b is also out of the display screen of the input/display unit 1 and is not displayed. The drawing object A and the drawing object B are displayed whereas the drawing object C is masked by the second background drawing object and is not displayed. Furthermore, relative positional relationship between the upper second drawing picture and the lower first drawing picture is changing continually in this case.

Figure 8:
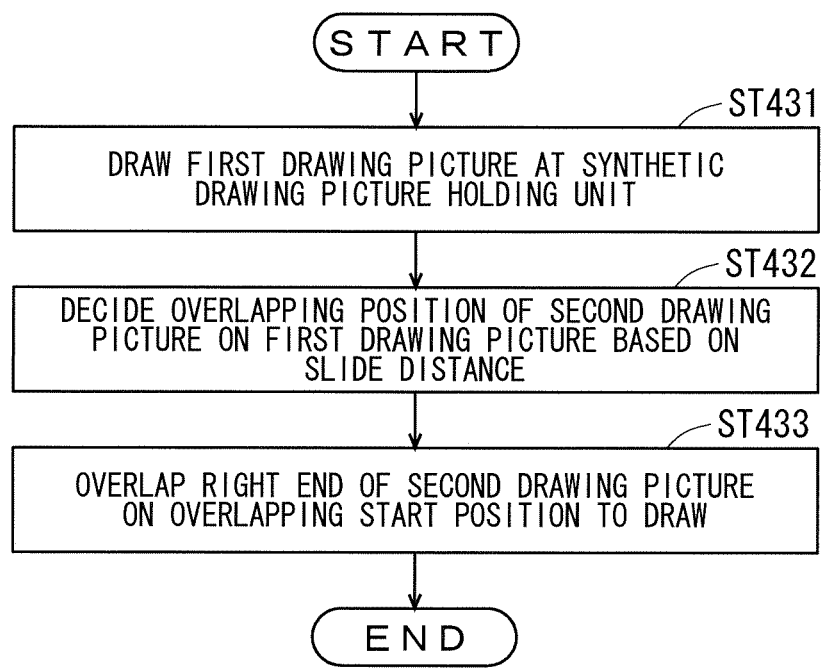
FIG. 8 is a flowchart illustrating behavior of the map display device.
Figure 9:
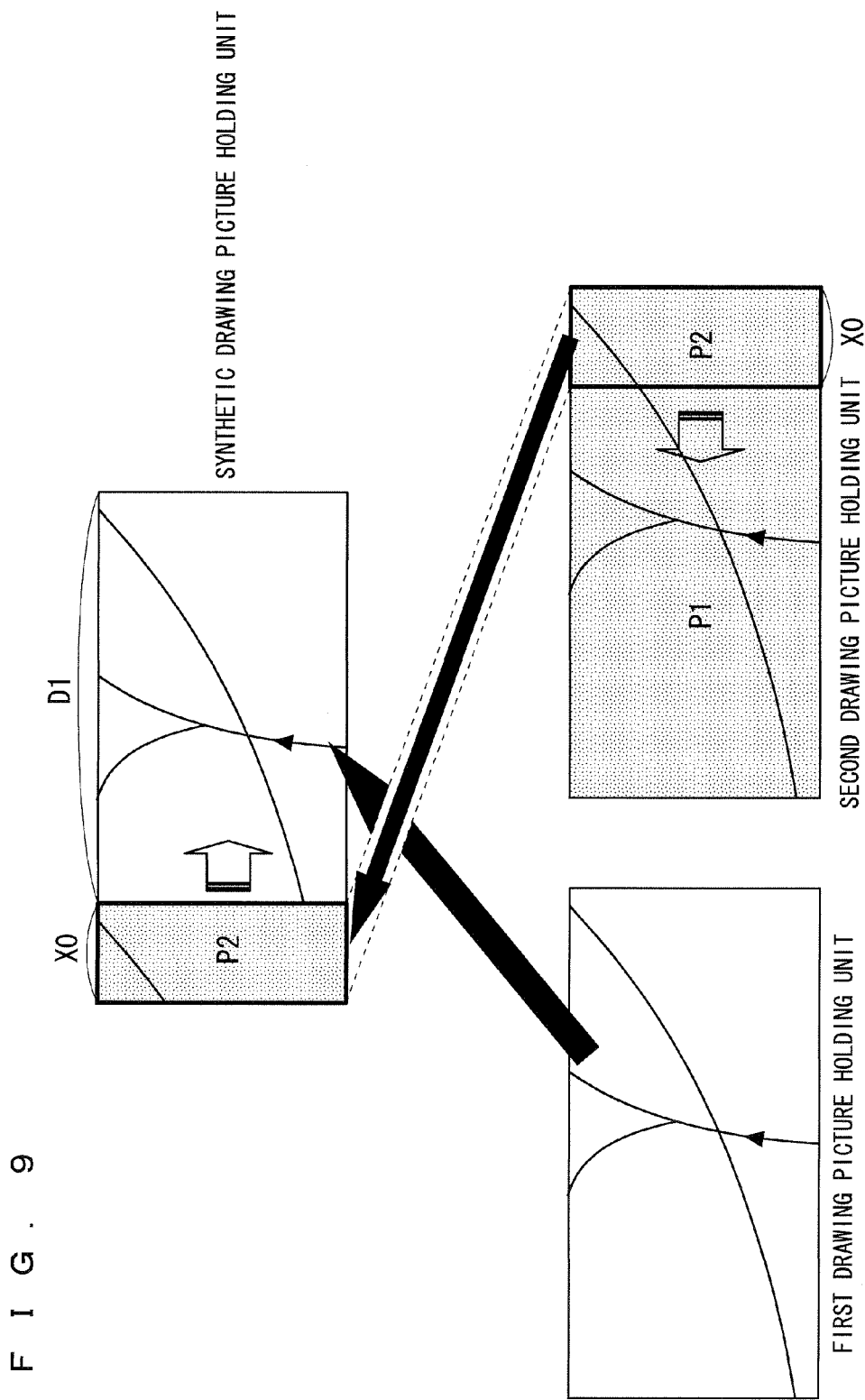
FIG. 9 is a view illustrating behavior of the map display device.
Figure 10:
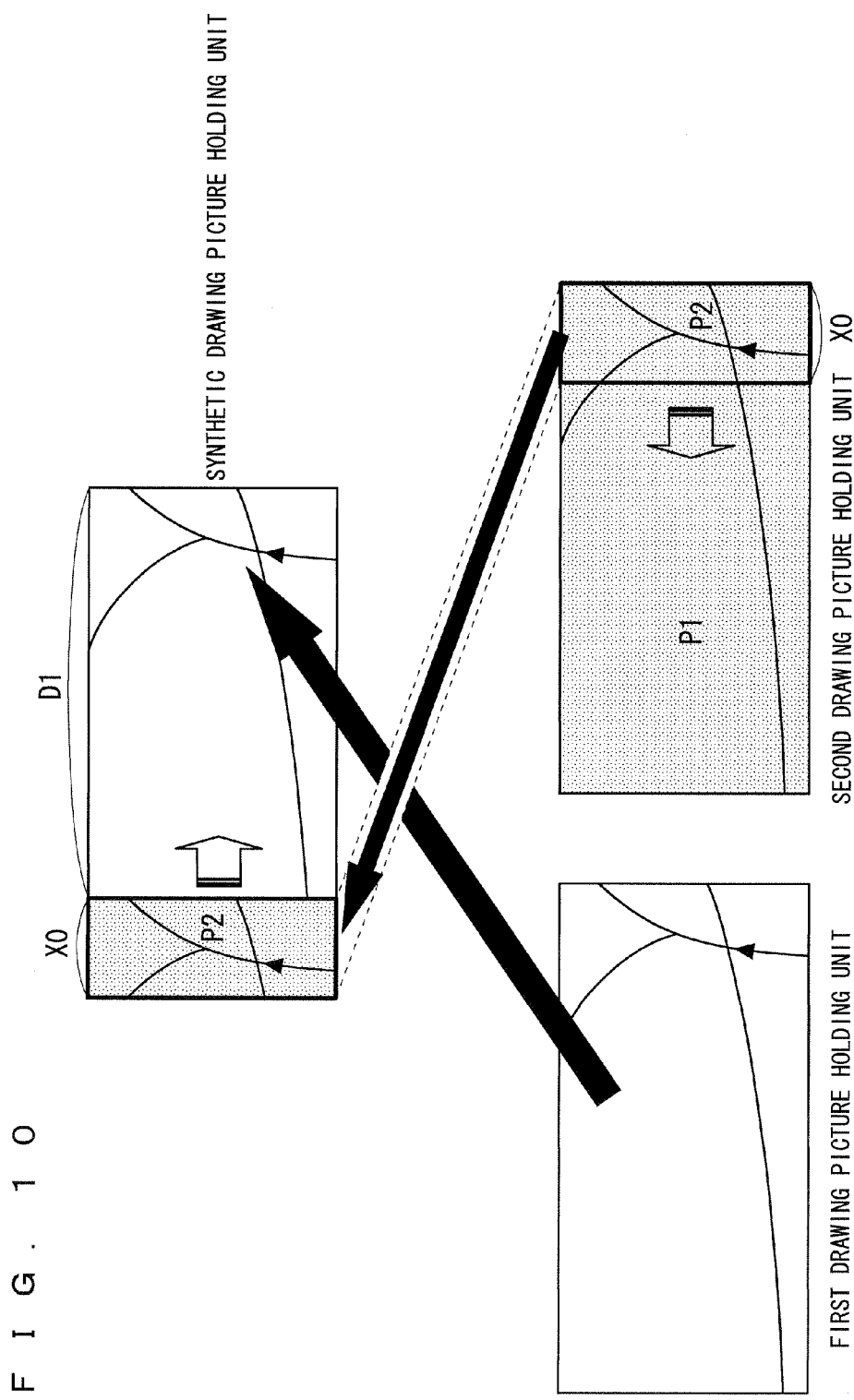
FIG. 10 is a view illustrating behavior of the map display device.

Formation of a synthetic drawing picture with sliding in by means of board slide is described next with reference to FIGS. 8 to 10. In this case, any parts of the map drawing pictures are not overlapped with each other at the initial stage (a completely displaced state). The second drawing picture shifts from the outside of the display screen, is gradually overlapped on the first drawing picture, and comes into a completely overlapped state in the end.

Initially in step ST431, the first drawing picture held in the first drawing picture holding unit 404 is drawn at the synthetic drawing picture holding unit 408.

Subsequently in step ST432, an overlapping position of the second drawing picture on the first drawing picture is decided on the basis of the slide distance X0 updated in accordance with slide operation. FIGS. 9 and 10 schematically illustrate methods of synthesizing drawing pictures in cases where drawing objects are displayed at different positions in the drawing pictures.

If the slide distance X0 is zero, the overlapping position is decided so that the second drawing picture is completely out of the display screen.

If the slide distance X0 is updated to a value other than zero, the overlapping position is decided on the basis of the slide distance X0 corresponding to user's gesture operation.

If attention points are set, the overlapping position of the second drawing picture on the first drawing picture is preferably decided so that a first attention point in the first drawing picture gradually approaches a second attention point in the second drawing picture as the slide distance X0 is updated.

Then in step ST433, the second drawing picture is overlapped and drawn in accordance with the overlapping position, more particularly, the overlapping start position.

In a case where the second drawing picture is slid from the left into the display screen, drawing is executed in the state where the second drawing picture is overlapped so that the right end thereof coincides with the overlapping start position.

A portion not overlapped with the first drawing picture (P1 in FIGS. 9 and 10) is not displayed on the display screen. In this state, the display screen displays the first drawing object in the first drawing picture having the width D1 and not overlapped with the second drawing picture as well as the second drawing object in the second drawing picture having width equal to the slide distance X0 from the right end of the second drawing picture (P2 in FIGS. 9 and 10).

Figure 11:
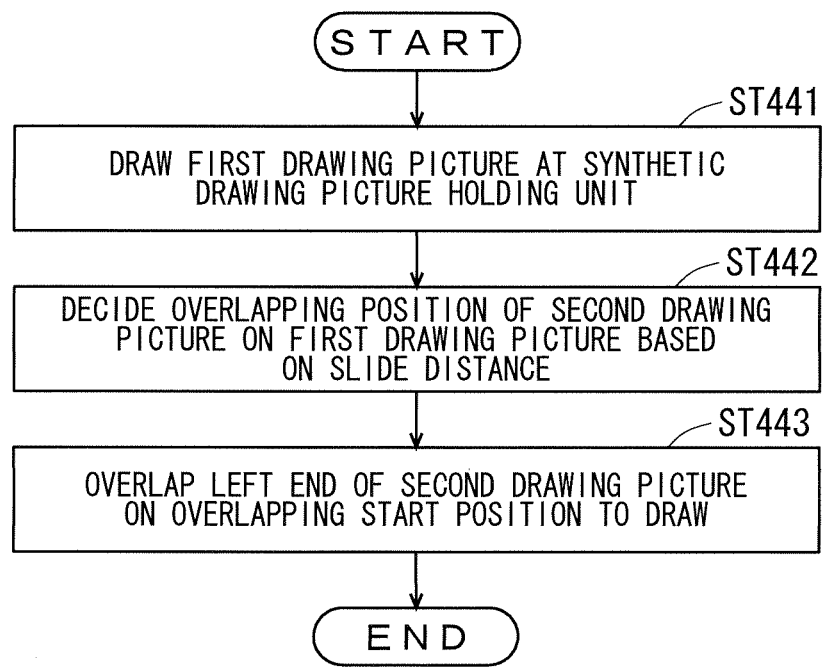
FIG. 11 is a flowchart illustrating behavior of the map display device.
Figure 12:
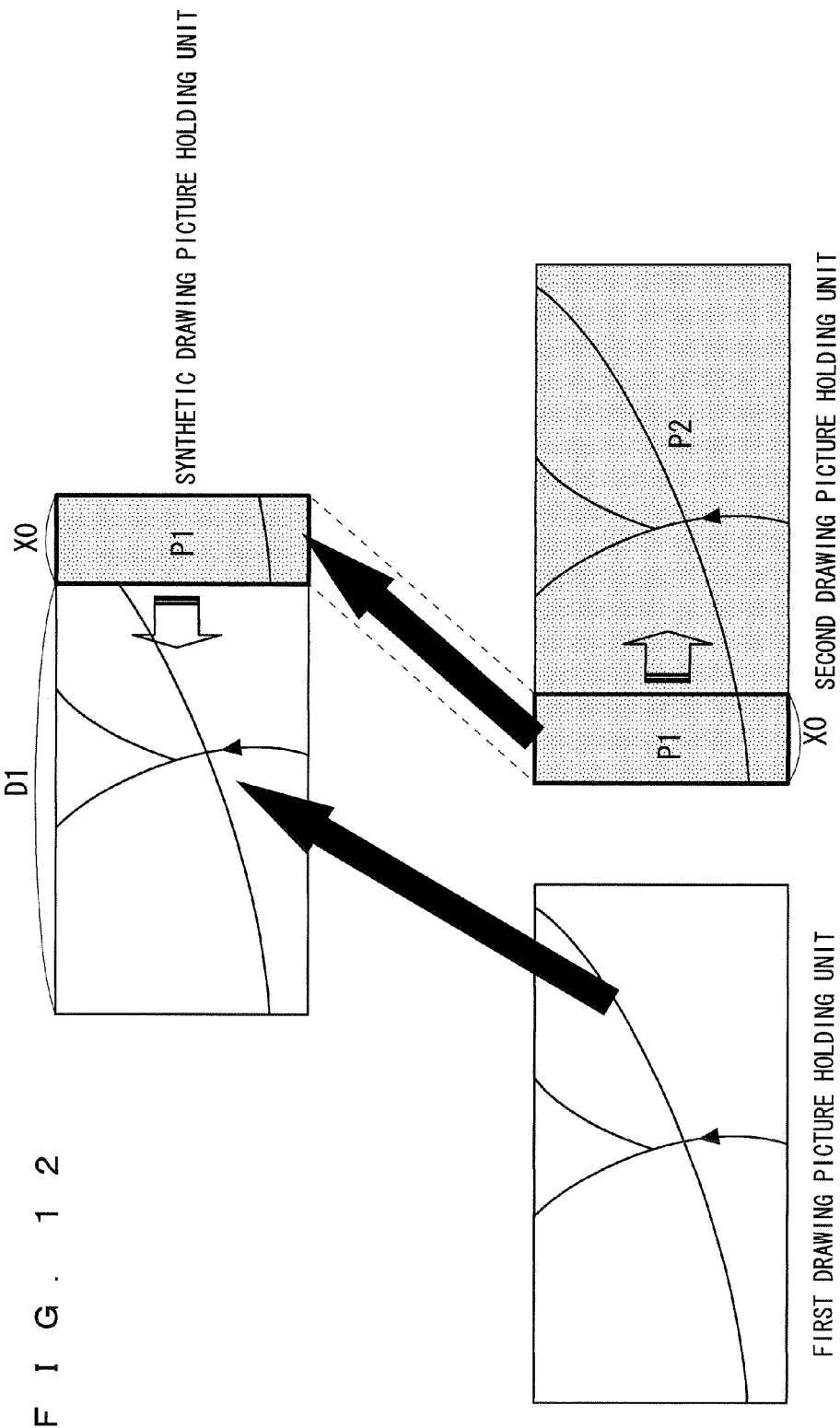
FIG. 12 is a view illustrating behavior of the map display device.
Figure 13:
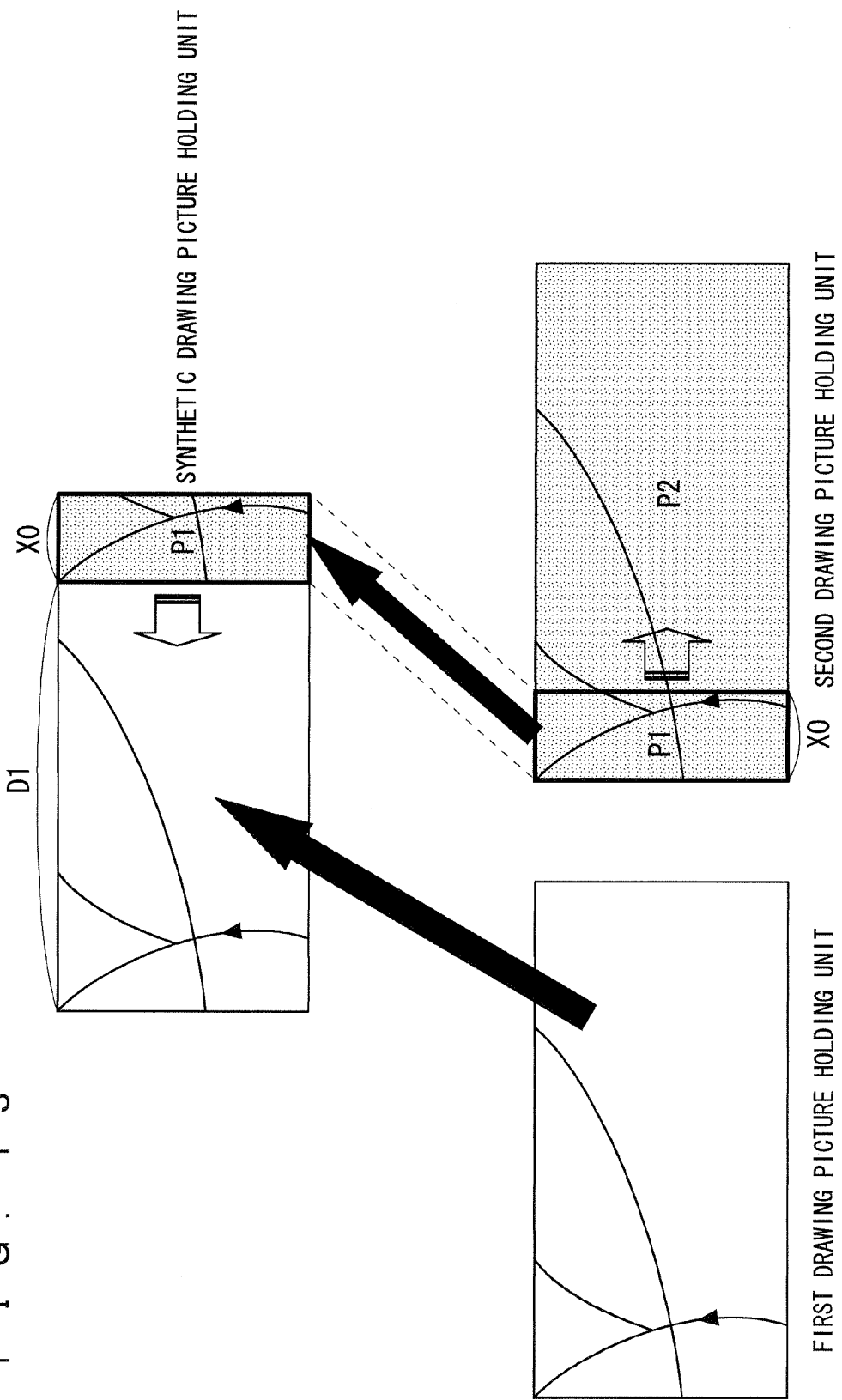
FIG. 13 is a view illustrating behavior of the map display device.

Sliding in rightward by means of board slide is described next with reference to FIGS. 11 to 13. In this case, the second drawing picture shifts rightward from the outside of the display screen so as to be overlapped with the first drawing picture.

Initially in step ST441, the first drawing picture held in the first drawing picture holding unit 404 is drawn at the synthetic drawing picture holding unit 408.

Subsequently in step ST442, an overlapping position of the second drawing picture on the first drawing picture is decided on the basis of the slide distance X0 updated in accordance with slide operation. FIGS. 12 and 13 schematically illustrate methods of synthesizing drawing pictures in cases where drawing objects are displayed at different positions in the drawing pictures.

If the slide distance X0 is zero, the overlapping position is decided so that the second drawing picture is completely out of the display screen. In this case, the second drawing picture is out of the display screen at the (right) side opposite to that shown in FIGS. 9 and 10.

If the slide distance X0 is updated to a value other than zero, the overlapping position of the second drawing picture on the first drawing picture is decided on the basis of the slide distance X0 corresponding to user's gesture operation relevant to this update.

Then in step ST443, the second drawing picture is drawn in a state of being overlapped on the first drawing picture in accordance with the overlapping position, more particularly, the overlapping start position. In a case where the second drawing picture is slid from the right into the display screen, drawing is executed in the state where the second drawing picture is overlapped so that the left end thereof coincides with the overlapping start position.

A portion not overlapped with the first drawing picture (P2 in FIGS. 12 and 13) is not displayed on the display screen. In this state, the display screen displays the first drawing object in the first drawing picture having the width D1 and not overlapped with the second drawing picture as well as the second drawing object in the second drawing picture having width equal to the slide distance X0 from the left end of the second drawing picture (P1 in FIGS. 12 and 13). These drawing objects are displayed laterally opposite to those shown in FIGS. 9 and 10.

The motions of board slide have been described above. These motions may be possibly performed in various cases of slide directions, sliding manners of the map drawing picture, and the like.

Curtain slide

Figure 14:
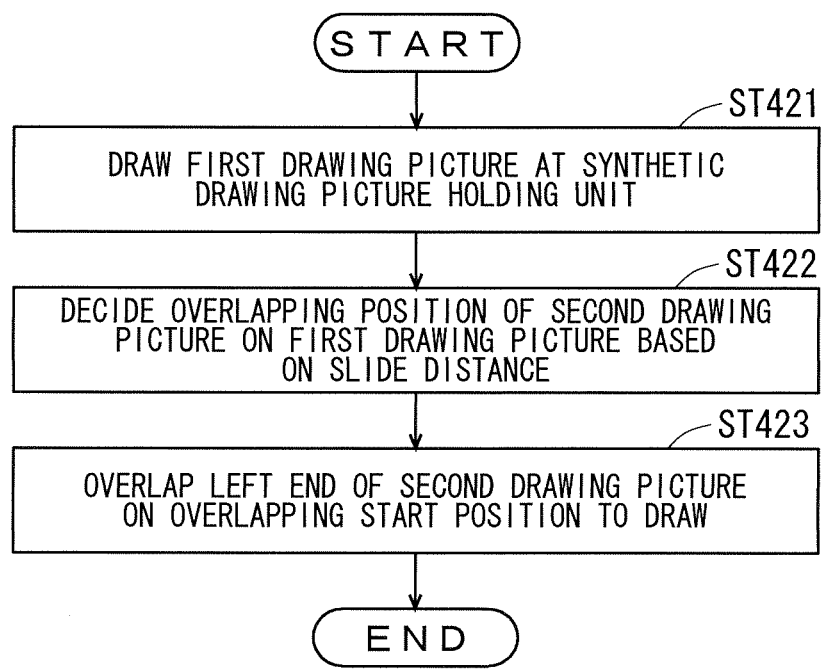
FIG. 14 is a flowchart illustrating behavior of the map display device.
Figure 15:
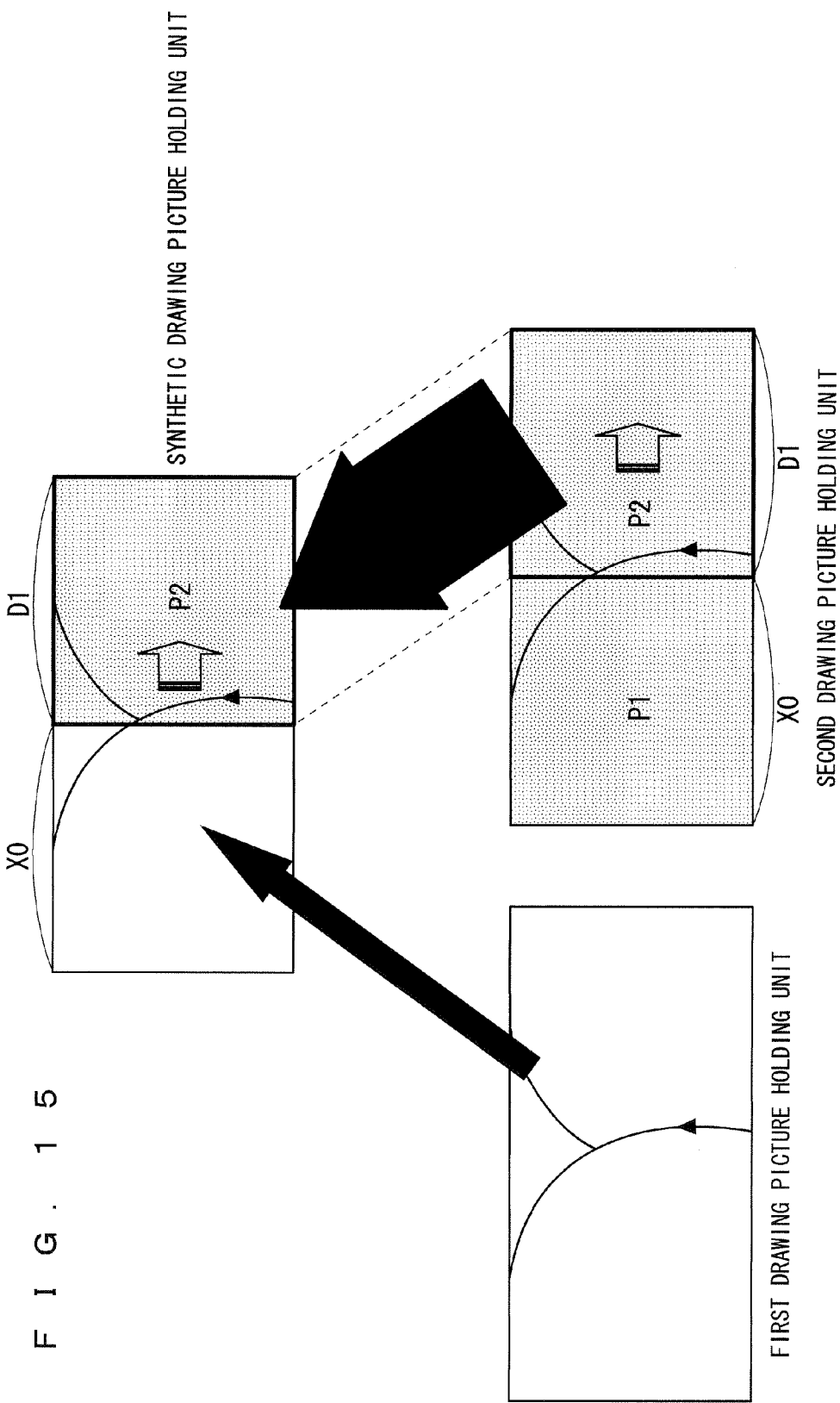
FIG. 15 is a view illustrating behavior of the map display device.

Formation of a synthetic drawing picture by means of curtain slide (step ST17 in FIG. 3) is described next with reference to FIGS. 14 to 16. Curtain slide is of a sliding type in which a display region is changed (increased or decreased) successively with a drawing object being displayed at a fixed position. Described in particular is a case where the upper second drawing picture is slid rightward out of the display screen from a completely overlapped state.

In which sliding type a synthetic drawing picture is formed can be distinguished on the basis of a mode of user's gesture operation or can be preset in accordance with combination of maps to be displayed.

Initially in step ST421, the first drawing picture held in the first drawing picture holding unit 404 is drawn at the synthetic drawing picture holding unit 408.

Subsequently in step ST422, an overlapping position of the second drawing picture on the first drawing picture is decided on the basis of the slide distance X0 updated in accordance with slide operation.

If the slide distance X0 is zero, the overlapping position is decided so that the first drawing picture and the second drawing picture are completely overlapped with each other and the second drawing object completely masks the first drawing object. If attention points are set, the overlapping position is preferably decided so that a first attention point in the first drawing picture is overlapped and coincides with a second attention point in the second drawing picture on the display screen. In other words, when the first drawing picture and the second drawing picture each include a peripheral map of the vehicle, the overlapping position is preferably decided so that the current positions of the vehicle in these drawing pictures coincide with each other.

If the slide distance X0 is updated to a value other than zero, the overlapping position of the second drawing picture on the first drawing picture is decided on the basis of the slide distance X0 corresponding to user's gesture operation.

In the drag mode, an overlapping start position is set with a shift distance from a position on the display screen initially touched by a user (the slide distance X0 in FIG. 15) being considered as an offset.

The overlapping start position is set similarly in the shutter mode, in which the overlapping position is returned to an original position simultaneously when a user terminates operation of touching the display screen.

In the flick mode, the overlapping start position of the second drawing picture is set with an amount increasing with time (the slide distance X0 in FIG. 15 increasing with time) being considered as an offset.

Then in step ST423, the second drawing picture is drawn in a state of being overlapped on the first drawing picture in accordance with the overlapping position, more particularly, the overlapping start position. In a case where the second drawing picture is slid rightward out of the display screen, drawing is executed in the state where the second drawing picture is overlapped so that the gradually removed left end thereof coincides with the overlapping start position. In other words, the overlapping start position coincides with the position offset from the left end of the second drawing picture by the slide distance X0.

A portion in the second drawing picture removed from the first drawing picture (P1 in FIG. 15) is not displayed on the display screen. In this state, the display screen displays the first drawing object in the first drawing picture having width equal to the slide distance X0 and not overlapped with the second drawing picture as well as the second drawing object in the second drawing picture having the width D1 from the right end of the second drawing picture (P2 in FIG. 15).

Sequentially forming a synthetic drawing picture as described above enables motions shown in FIG. 16 (sliding out by means of curtain slide). In FIG. 16, a second drawing picture including a drawing object a, a drawing object b, a drawing object c, and a second background drawing object is overlapped on a first drawing picture including a drawing object A, a drawing object B, a drawing object C, and a first background drawing object. It is assumed that the drawing object B is located at a first attention point in the first drawing picture and the drawing object b is located at a second attention point in the second drawing picture. The first background drawing object and the second background drawing object can be rectangular objects being equal in size to the drawing pictures and painted in cream. The drawing object a, the drawing object b, and the drawing object c are drawn on the second background drawing object in the second drawing picture.

Figure 16:
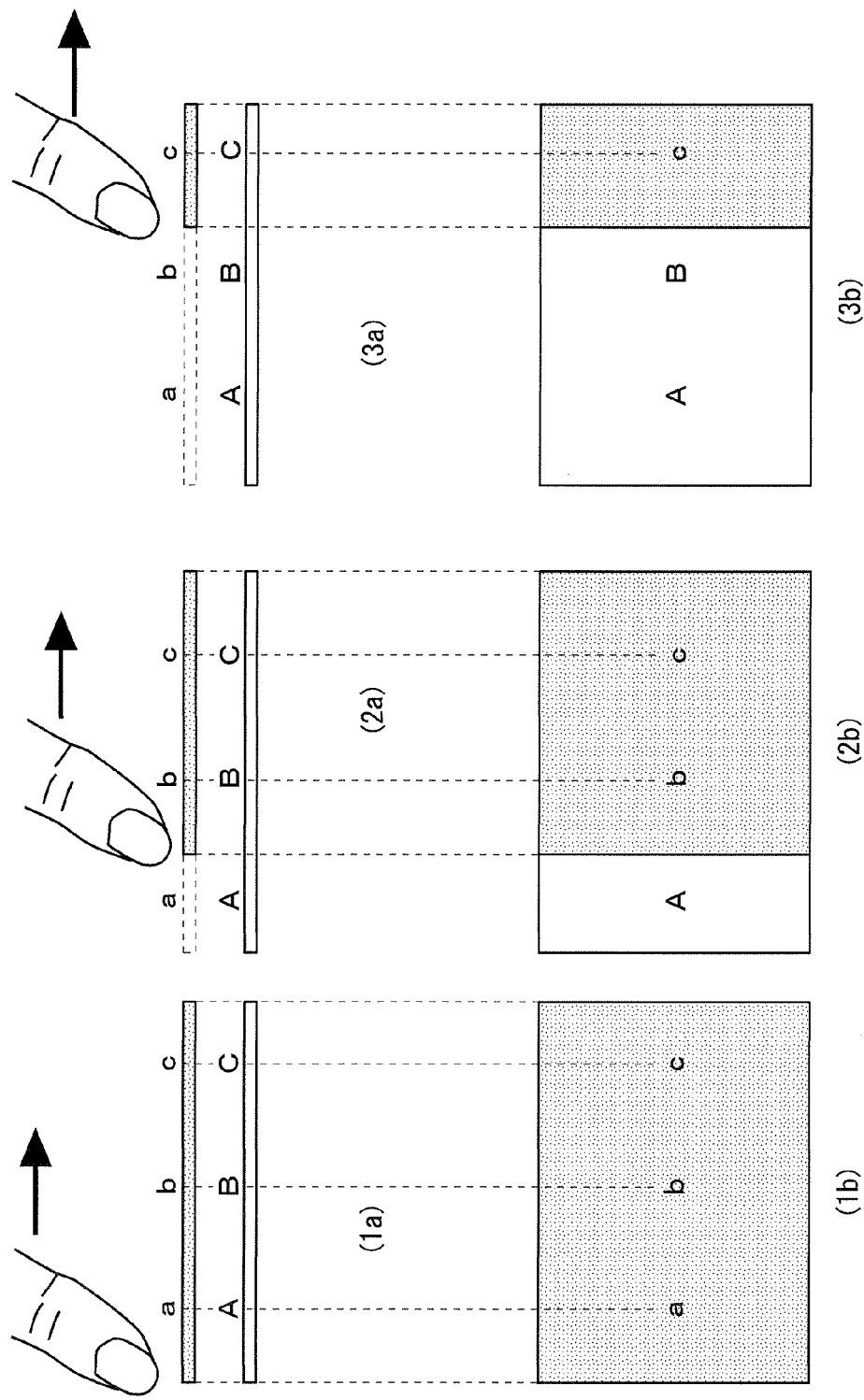
FIG. 16 shows views illustrating behavior of the map display device.

In FIG. 16, portions (1a), (2a), and (3a) are pattern views of the lower first drawing picture and the upper second drawing picture seen in a lateral direction, whereas portions (1b), (2b), and (3b) are pattern views of the first drawing picture and the second drawing picture seen from above.

A user performs rightward drag operation in FIG. 16 at the input/display unit 1. In this case, the overlapping start position in the upper second drawing picture is updated sequentially (from 1a to 3a through 2a, or from 1b to 3b through 2b). The second drawing picture is displayed while being slid successively like pulling a curtain (curtain slide), with the drawing object being displayed at a fixed position.

In the state of (1a) and (1b), the first drawing picture and the second drawing picture are in a completely overlapped state and the second background drawing object masks the drawing objects A, B, and C. If the second drawing picture is smaller than the first drawing picture, the second drawing picture has only to be overlapped on a region in the first drawing picture equal in size to the second drawing picture.

In the state of (2a) and (2b), the drawing object b and the drawing object c are displayed on the display screen of the input/display unit 1, whereas the leftmost drawing object a is not displayed. The drawing object A is displayed whereas the drawing objects B and C are masked by the second background drawing object and are not displayed. Furthermore, relative positional relationship between the upper second drawing picture and the lower first drawing picture is fixed. In other words, the first attention point and the second attention point always coincide with each other on the display screen.

In the state of (3a) and (3b), the upper second drawing picture is removed further to the right, and the drawing object b is also removed from the display screen of the input/display unit 1 and is not displayed. The drawing object A and the drawing object B are displayed whereas the drawing object C is masked by the second background drawing object and is not displayed. In a case where attention points are set, the drawing object B serving as a first attention point is displayed at a position of the removed drawing object b serving as a second attention point. It is thus possible to easily comprehend the relevance between these drawing objects (see also FIG. 15). Furthermore, relative positional relationship between the upper second drawing picture and the lower first drawing picture is fixed.

The second background drawing object is assumed to be in plain cream. If there is gradation in color in FIG. 16 such that the drawing object a and its vicinity is in cream and the drawing object c and its vicinity is in pink, the portions (1a), (2a), and (3a) have a drawing background color close to uniform pink.

In the curtain slide described above, the second drawing object is displayed at an unchanged position and the second drawing picture is slid, so that the lower first drawing picture is visible in a varied range. Described herein is the case where the second drawing picture is slid rightward out of the display screen by means of curtain slide. The slide direction is not limited to a uniform direction such as rightward, leftward, upward, or downward. The second drawing picture can be slid radially from the position touched by a user. There may be various cases in which the second drawing picture blinks or fades while being slid.

The sliding method described above enables slide operation regardless of the position operated with touching or the like by a user in the display area of the second drawing picture. There can be alternatively limitation to the display range of the second drawing picture for accepting slide operation. For example, in the display range of the second drawing picture, only a region around the boundary with the first drawing picture can be set to accept slide operation.

The area accepting slide operation can be displayed by means of an icon or the like. In this case, it is possible to accept all of drag operation, flick operation, and transition of ordinary operation by simple touch operation. This leads to provision of a device of fine usability.

In the above example, the second background drawing object is assumed to be equal in size to the drawing picture, be in cream, and have a rectangular shape. The background drawing object is not limited to such a rectangular shape, but can have a trapezoidal shape, have an elliptical shape, or be punched. Furthermore, the background drawing object is not limited to a light color. The background drawing object having gradation or a pattern enables display excellent in design.

In the above example, the first information storage 2 and the second information storage 3 store the first drawing object and the second drawing object, respectively. The overall controller 402 can alternatively generate both or either one of the drawing objects through software processing. For example, the overall controller 402 can generate a sign indicating the position of its own car in accordance with a program. The overall controller 402 can alternatively generate both or either one of the background drawing objects through software processing.

The above example refers to the method of rendering in the drawing picture the background drawing object as a rectangular drawing object. The method of generating a background drawing object is not limited to this method. In a case where the drawing picture itself has a function of generating a background color corresponding to a background drawing object, the overall controller 402 can set the background color of each of the first drawing picture holding unit and the second drawing picture holding unit through software processing.

In another case where the synthetic drawing unit 407 inputs setting of a background color of each of the first drawing picture and the second drawing picture to generate a synthetic drawing picture in accordance with the hardware structure or software processing, the overall controller 402 can set the background color of each of these drawing pictures through software processing.

A drawing object in the present description has a concept including an object eventually displayed at the input/display unit 1 through software processing mentioned above.

Partial slide

Figure 17:
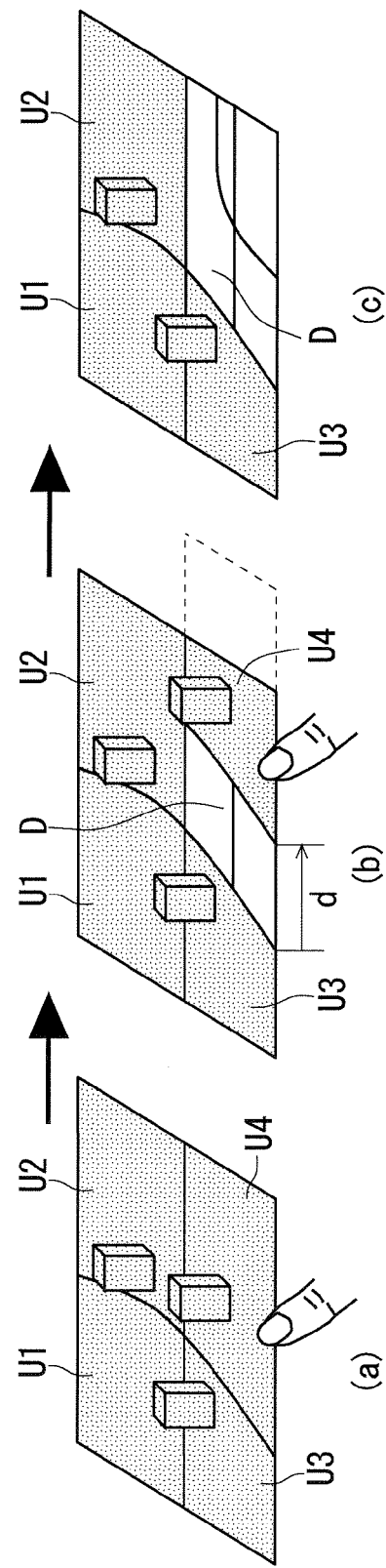
FIG. 17 is a view illustrating behavior of the map display device.

Sliding the entire second drawing picture has been mainly described so far. It is possible to alternatively slide a partial designated area in the second drawing picture, or so-called partial slide. FIG. 17 exemplifies such partial slide. Partial slide is performed by means of board slide in the following example. Such partial slide can be performed by means of any alternative sliding method.

FIG. 17 exemplifies a case where the first drawing picture displaying a planar map is overlapped with the second drawing picture displaying a relief map in a geographical range identical with that of the planar map. The planar map in the first drawing picture can possibly display POI information more detailed than that displayed in the relief map in the second drawing picture.

In a portion (a) of FIG. 17, the entire first drawing picture is overlapped with the second drawing picture (the completely overlapped state) and only the second drawing picture is displayed on the display screen. The second drawing picture is divided into four areas of an upper left area U1, an upper right area U2, a lower left area U3, and a lower right area U4, with respect to a reference point at an intersection in the second drawing picture.

If a user touches the area U4 and performs rightward drag operation, only the area U4 is selected as a slid area and is slid rightward by means of board slide on the display screen. A portion (b) of FIG. 17 shows a state where the area U4 is slid by a slide distance X0=d. The area U4 thus slid causes a first drawing picture D having been hidden by the area U4 in the second drawing picture to be displayed. A portion (c) of FIG. 17 shows a state where the area U4 is completely slid out due to further sliding.

In this manner, the first drawing picture D is displayed in a region from where the area U4 is removed. When the second drawing picture is slid, the first drawing picture displaying a planar map at a spot same as that displayed in the slid drawing picture is displayed. A user is thus capable of easily comprehending relevance between pieces of map information in these drawing pictures. Furthermore, only the area U4 is removed while the area U2 remains the same, so as to reveal information in the area U2 that is in contact with the area U4 and has been hidden behind a three-dimensional building in the area U4. It is thus effectively possible to display information demanded by a user. Moreover, a user is capable of sliding any of the areas U1 to U4. Sliding only a necessary area improves convenience for the user.

Figure 18:
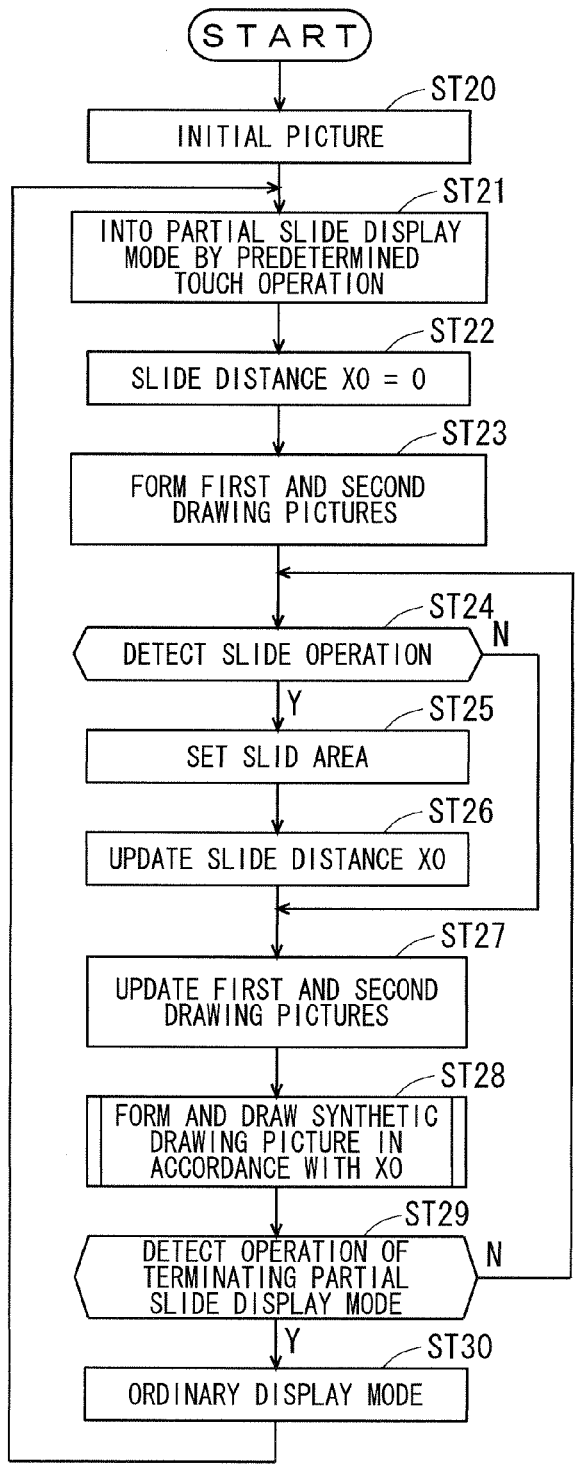
FIG. 18 is a flowchart illustrating behavior of the map display device.

The partial slide motions are described with reference to the flowchart in FIG. 18. When the map display device is turned ON, the input/display unit 1 displays an initial picture (step ST20). The initial picture is in an ordinary display mode of receiving ordinary touch operation.

Then in step ST21, a user performs predetermined operation on the initial picture displayed by the input/display unit 1 so as to transition into a partial slide display mode. In the partial slide display mode, a user is capable of sliding a predetermined area in the upper map drawing picture (partial slide) by performing gesture operation to the input/display unit 1. The display mode is changed by touch operation, button operation, icon operation, gesture operation, voice input, or the like.

The overall controller 402 stores a parameter including a type of the display mode. Reference to the parameter enables determining whether or not the partial slide display mode is selected. For example, whether or not the partial slide display mode is selected is determined on the basis of the fact that the parameter has a value larger or smaller than a predetermined threshold. The parameter can be set by user operation such as icon operation or voice input, or can be changed automatically depending on preset conditions (including a state of a vehicle and a display state on the display screen). Still alternatively, an icon or the like can be displayed on the display screen of the input/display unit 1, so that a user is capable of visually recognizing whether or not the partial slide display mode is selected.

When the display mode transitions to the partial slide display mode, the slide distance X0 is set to zero in step ST22.

Figure 20:
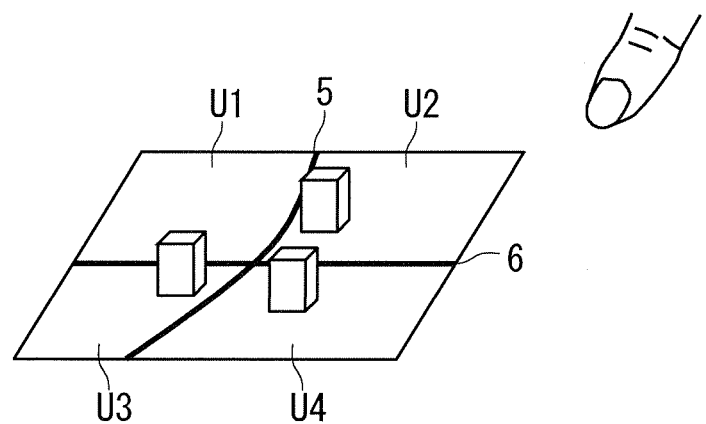
FIG. 20 is a view illustrating behavior of the map display device.

Then in step ST23, a first drawing picture and a second drawing picture are formed. The first information drawing unit 403 and the second information drawing unit 405 form the pictures in accordance with user input information. The first and second drawing pictures thus formed are drawn and held in the first drawing picture holding unit 404 and the second drawing picture holding unit 406, respectively. The second drawing picture is divided into a plurality of areas in accordance with a predetermined rule. As an example of the predetermined rule, FIG. 20 shows division of the second drawing picture into the four areas (U1, U2, U3, and U4) along roads 5 and 6 including a main intersection as a reference point.

Subsequently in step ST24, it is detected whether or not slide operation to the second drawing picture has been performed. The input analyzer 401 analyzes user's gesture operation at the input/display unit 1 to detect slide operation.

If slide operation is detected in step ST24, an area including the position touched by the user at the beginning of the slide operation is set as a slid area out of the areas in the second drawing picture (step ST25).

Then in step ST26, the slide distance X0 is updated in accordance with the slide operation.

Subsequently in step ST27, the drawing object displayed in each of the first drawing picture and the second drawing picture is updated. This update corresponds to information changing every moment, such as a displayed content varied in accordance with travel of the vehicle or traffic jam information.

Then in step S28, the synthetic drawing unit 407 forms a synthetic drawing picture from the first drawing picture and the second drawing picture in accordance with the slide distance X0. Thereafter, the synthetic drawing picture is drawn at the input/display unit 1. Details thereof are to be described later.

Then in step ST29, the overall controller 402 determines whether or not the input analyzer 401 has detected predetermined user operation of terminating the partial slide display mode. The process proceeds to step ST30 if the operation has been detected. In contrast, the process returns to step ST24 if the operation has not been detected. The partial slide display mode can be terminated by touch operation, button operation, icon operation, gesture operation, voice recognition, or the like.

The display mode then transitions to the ordinary display mode in step ST30, and the process returns to step ST21.

Figure 19:
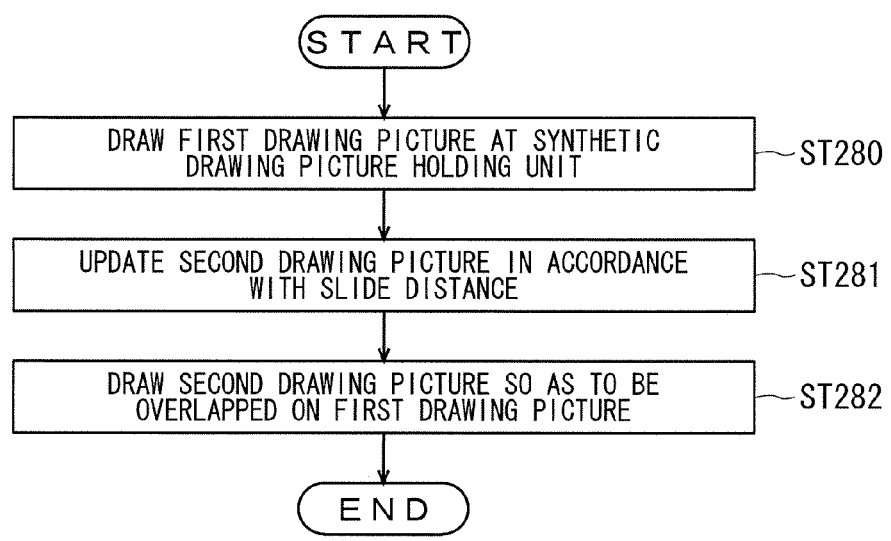
FIG. 19 is a flowchart illustrating behavior of the map display device.

Detailed behavior of forming a synthetic drawing picture at the synthetic drawing unit 407 (step ST28 in FIG. 18) is described next with reference to the flowchart in FIG. 19. The first drawing picture is initially drawn at the synthetic drawing picture holding unit 408 (step ST280).

Figure 21:
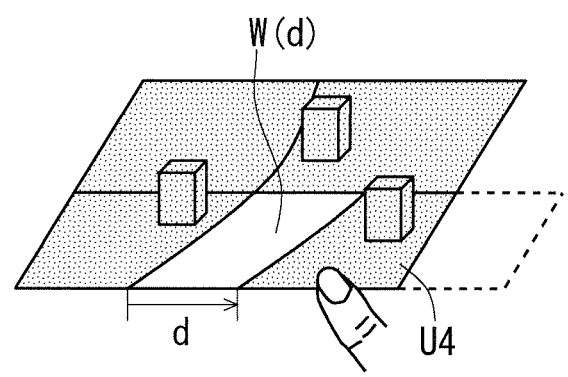
FIG. 21 is a view illustrating behavior of the map display device.

The second drawing picture is then updated in accordance with the slide distance X0 (step ST281). If the slide distance X0=d, as shown in FIG. 21, the slid area is shifted by the distance d in a slide direction and a region W(d) having the width d and generated by this shift is displayed transparently.

The second drawing picture is drawn in a state of being overlapped with the first drawing picture so that the left end of the second drawing picture coincides with the overlapping start position (step ST282). According to the example of FIGS. 17(a) to 17(c), the second drawing picture is drawn so that the left end of the second drawing picture is overlapped on the left end of the first drawing picture and these pictures excluding the slid area are in the completely overlapped state. In a case where the second drawing picture is partially overlapped on the first drawing picture, the left end of the second drawing picture is located to coincide with a predetermined overlapping start position.

The region W(d) is displayed transparently in the second drawing picture, so that, on the actual display screen, the lower first drawing picture is displayed in the area from which the slid area is slid. In the slid area, any region shifted out of the display screen of the input/display unit 1 is not displayed on the screen.

Method of designating slid area

Figure 22:
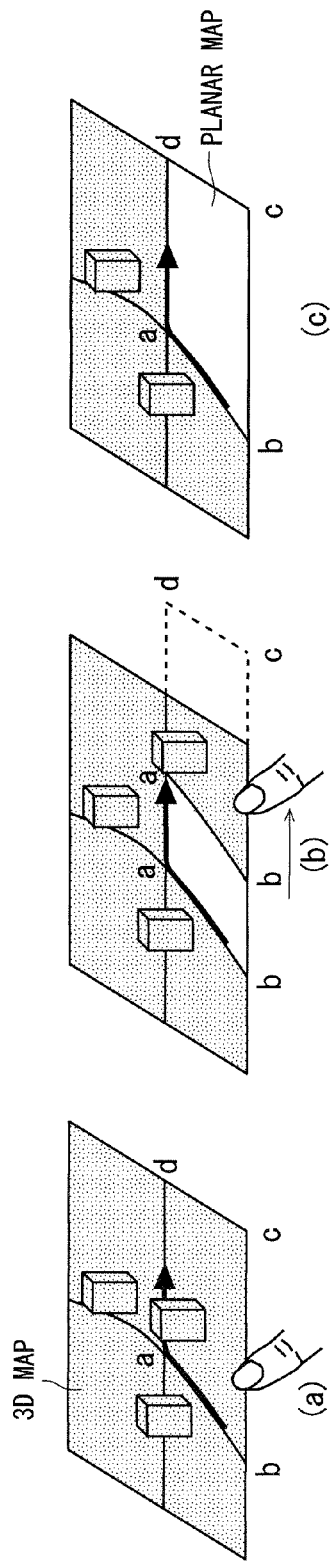
FIG. 22 is a view illustrating behavior of the map display device.

FIG. 22 is a view exemplifying designation of a slid area in the second drawing picture displaying a heading-up guide picture. In FIG. 22, each of the first and second drawing pictures displays a heading-up guide route, and the first drawing picture displays a planar map whereas the second drawing picture displays a relief map. The second drawing picture is displayed so as to be overlapped on the entire first drawing picture, and geographical ranges in these drawing pictures are identical with each other.

In a portion (a) of FIG. 22, the second drawing picture (as well as the first drawing picture) displays a route of turning right at an intersection a and heading for a spot d. It is hard to comprehend the route a to d because a three-dimensional feature is overlapped on the route. When a region in the second drawing picture displaying the route a to d and its peripheral range is set as a slid area to be slid, the first drawing picture displaying the planar map is displayed so that the route after turning right is easily comprehended.

For example, the overall controller 402 sets, as the slid area, a region surrounded with a route b to a to the intersection a, the route a to d after turning right at the intersection a, and display ends b to c and c to d of the second drawing picture. Any three-dimensional feature overlapped on the route a to d is also included in the slid area.

If a user touches the slid area and performs rightward drag operation, the slid area is slid rightward as shown in a portion (b) of FIG. 22. The first drawing picture is accordingly displayed as shown in a portion (c) of FIG. 22, so that the route a to d after turning right can be displayed clearly.

Figure 23:
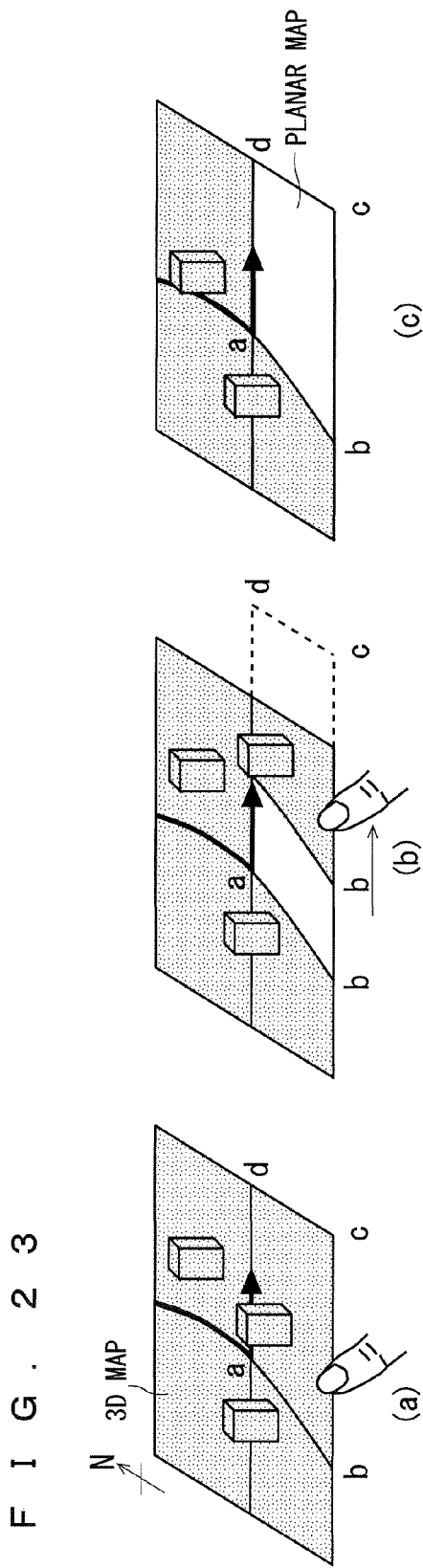
FIG. 23 is a view illustrating behavior of the map display device.

FIG. 23 is a view exemplifying designation of a slid area in the second drawing picture displaying a north-up guide picture. In FIG. 23, each of the first and second drawing pictures displays a north-up guide route, and the first drawing picture displays a planar map whereas the second drawing picture displays a relief map. The second drawing picture is displayed so as to be overlapped on the entire first drawing picture, and geographical ranges in these drawing pictures are identical with each other.

As shown in a portion (a) of FIG. 23, the second drawing picture (as well as the first drawing picture) displays a route of traveling down to the south, turning left with respect to the travel direction at the intersection a, and heading for the spot d. It is hard to comprehend the route a to d because a three-dimensional feature is overlapped on the route. When a region in the second drawing picture displaying the route a to d and its peripheral range is set as a slid area to be slid, the first drawing picture displaying the planar map is displayed so that the route after turning left is easily comprehended.

For example, the slid area is set as a region surrounded with a route a to b in a case of traveling straight at the intersection a, the route a to d in the case of turning left at the intersection a, and the display ends b to c and c to d of the second drawing picture. Any three-dimensional feature overlapped on the route a to d is also included in the slid area.

If a user touches the slid area and performs rightward drag operation, the slid area is slid rightward as shown in a portion (b) of FIG. 23. The first drawing picture is accordingly displayed as shown in a portion (c) of FIG. 23, so that the route after turning right can be displayed clearly.

In each of the examples of FIGS. 22 and 23, the slid area is uniquely set in order to avoid the state where any three-dimensional feature is overlapped on the route. Alternatively, the second drawing picture can be divided into a plurality of areas with respect to a reference point of an intersection to turn right or left, and a user can select any of the areas as a slid area.

When division into areas along a road or a route is executed, the number of the divided areas depends on the shape of the road or the route. For example, when no intersection is displayed on the picture, the picture can be divided into two areas along a straight road (route) as a boundary. When an intersection is displayed but only a straight route is displayed as the route, the picture can be divided into four areas with respect to the intersection as a reference point or can be divided into two areas along the straight route as a boundary. When a three-road junction is displayed, the picture can be divided into three areas along the three-road junction.

When a plurality of roads are displayed on the picture, the picture can be divided into a plurality of areas with respect to a main road (e.g. national road) as a reference point. When a plurality of main roads are displayed, the picture can be divided into areas with respect to these main roads as reference points. When both the route and any main road not included in the route are displayed, the picture can be divided into areas with respect to the route and the main road as reference points.

When the second drawing picture displays a peripheral map of its own car with no route and displays a plurality of intersections on the road currently traveled, the picture can be divided into areas with respect to the intersections as reference points, or can be divided into areas with respect to the intersection closest to the current vehicle position as a reference point. Alternatively, it is possible to estimate a tentative route on the basis of past travel records and divide into areas with respect to an intersection to be turned right or left on the tentative route as a reference point.

Figure 24:
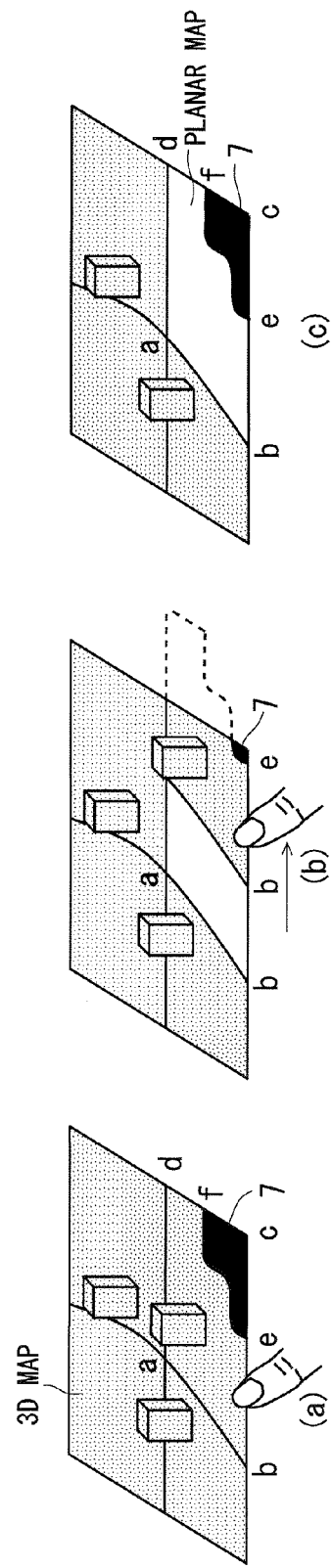
FIG. 24 is a view illustrating behavior of the map display device.

FIGS. 22 and 23 show the methods of setting the slid area along the road (particularly the route). Alternatively, the slid area can be set along a course line or an administrative section line, or can be set along a water system having a curved shape such as a pond as shown in FIG. 24. FIG. 24 shows a synthetic drawing picture in which the second drawing picture displaying a relief map is overlapped on the first drawing picture displaying a planar map.

In a portion (a) of FIG. 24, a slid area is set as a region surrounded with the roads a to b and a to d, outer peripheries b to e and d to f of the second drawing picture, and an outer periphery e to f of the water system. If a user touches the slid area and performs rightward drag operation, the slid area is slid rightward as shown in a portion (b) of FIG. 24. The first drawing picture is accordingly displayed as shown in a portion (c) of FIG. 24, so that the route after turning right can be displayed clearly.

Alternatively, in FIG. 24, a slid area can be set as a region surrounded with the roads a to b and a to d and the outer peripheries b to c and c to d of the second drawing picture, and the water system not displayed three dimensionally can be designated as an exceptional area due to determination that the water system does not need to be slid, so that the slid area excluding the exceptional area can be slid.

Still alternatively, as shown in FIG. 25, a slid area can be set in a predetermined range including a spot A designated by a user. In this case, the picture is not divided into areas upon formation of the second drawing picture in step ST23 of FIG. 18. In FIG. 25, a set slid area is located inside a circle having a predetermined radius and a center at the spot A designated by a user. The slid area can be alternatively set to have any shape such as a rectangular shape or a rhomboid shape. In any one of the methods of designating the slid area, it is possible to use the device by touching an elevated road or the like and sliding a slid area having a center at the elevated road and a predetermined radius, so that ordinary roads below the elevated road can be displayed.

The above example refers to the case of combining a 3D map and a planar map. Alternatively, the second drawing picture can display a current map whereas the first drawing picture can display a preset past map (e.g. a map prior to merger of cities, villages, or towns), so that a slid area after curtain slide displays a past geographical name. In this example, usability is improved because such a past geographical name can be checked. The second drawing picture can display current roads with past geographical names.

Modification Examples

The input/display unit 1 integrally includes an input unit that receives user input information and a display unit that displays a map drawing picture in accordance with the received input information and behavior control by the controller 4. The device can alternatively include separate configurations for achieving these functions. Furthermore, the drawing object displayed on the drawing picture is not limited to that related to map display. It is possible to display a drawing object of any type in accordance with demand of a user.

When the input/display unit 1 is embodied by the touch panel according to the present embodiment and overlap of drawing pictures is changed in accordance with gesture operation, a user is capable of easily performing operation. In a conventional map display device, picture operation has been performed by touching an operation icon displayed on a touch panel or by handling a mechanical switch or a dial. The conventional device had a user interface not necessarily achieving fine usability. The present invention adopts gesture operation that is applied to a portable terminal having a touch panel such as a smartphone. This achieves a user interface of fine usability.

The present invention is effectively utilized in picture operation on a map display device that is used under a condition of limited operation time, such as a map display device equipped on a vehicle. Furthermore, if slide directions of a drawing picture or display effects of a drawing picture being slid have flexibility, an entertainment aspect can be added to picture operation.

The input/display unit 1 can be embodied by not only an ordinary touch panel but also a three-dimensional touch panel that is of a capacitance detection type and is capable of detecting approach and contact of a finger.

The first information storage 2 and the second information storage 3 can be provided as separate storage media as shown in FIG. 1, or can be included in one storage medium. The first information storage 2 and the second information storage 3 can alternatively communicate with an external storage medium to obtain map information or the like.

The present embodiment exemplifies control of an overlapping state between the partial area in the second drawing picture and the first drawing picture using the sliding method. The overlapping state can be alternatively controlled using any of those other than the sliding method.

The first and second drawing pictures are not necessarily large enough to cover the entire display screen.

According to FIGS. 22 and 23, the slid area is slid when a user touches the slid area in the second drawing picture and performs drag operation. In a case where the slid area is set uniquely, the slid area can be slid even if a point outside the slid area is touched and drag operation is performed. When a point outside the slid area is touched and drag operation is performed, the entire second drawing picture can be alternatively slid so that entire slide and partial slide are both applicable.

The slid area is not limited to only one of the divided areas in the second drawing picture. A plurality of slid areas can be designated when a user touches a plurality of points in the second drawing picture. The plurality of slid areas thus designated can be slid simultaneously or sequentially.

More specifically, according to the example of FIG. 17, the area U4 can be touched to be designated as a slid area and be slid, and then the area U3 can be touched to be designated as a slid area and be slid. Alternatively, the areas U3 and U4 can be simultaneously touched with two fingers to be designated as slid areas, and the areas U3 and U4 can be slid simultaneously in accordance with drag operation of the two touched fingers.

Still alternatively, another divided area adjacent to the slid area and located downstream of the slide direction can be slid together so as to follow the sliding of the slid area.

Effects

A map display device according to the present embodiment is capable of displaying a plurality of drawing pictures including a first drawing picture and a second drawing picture in an at least partially overlapping manner. The first drawing picture displays at least one first drawing object, and the second drawing picture displays at least one second drawing object. At least one of the first and second drawing objects includes a drawing object related to map information. The first drawing picture and the second drawing picture are equal or different in size. The map display device includes an input unit that receives input of user operation related to display of a drawing picture, and a controller 4 for controlling an overlapping state between the first and second drawing pictures in accordance with input of user operation received by the input unit and outputting, to a display unit, a picture in which one of the first and second drawing objects masks the other one in a portion where the first drawing picture and a partial area in the second drawing picture are overlapped with each other. This configuration enables map display of fine usability for a user.

Furthermore, the controller 4 slides the partial area in the second drawing picture relatively to the first drawing picture so as to successively change the overlapping state between the first drawing picture and the partial area in the second drawing picture. A user can easily comprehend the relevance between the maps.

The sliding includes board slide by which the drawing object in the drawing picture is shifted in a slide direction in association with the sliding of the drawing picture and curtain slide by which the drawing object displayed at the display unit is not shifted. The map overlapping state is changed successively in any of these sliding types, so that a user can easily comprehend the relevance between the maps.

The input unit and the display unit are integrally formed as the input/display unit 1 in a display device provided with a touch panel. This configuration improves convenience for user input operation.

The partial area in the second drawing picture of which overlapping state with respect to the first drawing picture is controlled is designated by a user. The user is capable of deciding which one of the first and second drawing pictures is displayed in an arbitrary area. The map display device thus configured achieves fine usability.

The second drawing object is related to map information and the partial area in the second drawing picture of which overlapping state with respect to the first drawing picture is controlled includes a spot designated by a user, and is sectioned by a road, a course line, a water system, an administrative section line, or a display end. When the user designates a spot of which display is desirably switched, a predetermined area including the designated spot is decided as the partial area. The map display device thus configured achieves fine usability.

In the map display device according to the present embodiment, the second drawing object is related to map display and the partial area in the second drawing picture of which overlapping state with respect to the first drawing picture is controlled has a center at a feature designated by a user, a predetermined size, and a predetermined shape. When the user designates a spot of which display is desirably switched, a predetermined area including the designated spot is decided as the partial area. The map display device thus configured achieves fine usability.

In the map display device according to the present embodiment, the first drawing object is related to a guide route displayed on a planar map, the second drawing object is a drawing object related to a guide route displayed on a relief map, and the partial area of which overlapping state with respect to the first drawing picture is controlled includes a feature displayed so as to be overlapped on the guide route. The user is capable of sliding the partial area to remove the feature displayed so as to be overlapped on the guide route. The map display device thus configured achieves fine usability.

Furthermore, the controller 4 excludes a predetermined feature in the partial area in the second drawing picture of which overlapping state with respect to the first drawing picture is controlled from a target of the overlap control. The map display device thus configured achieves fine usability.

According to a map display method in the present embodiment, a plurality of drawing pictures including a first drawing picture and a second drawing picture are displayed so as to be in an at least partially overlapping manner. The first drawing picture displays at least one first drawing object, and the second drawing picture displays at least one second drawing object. At least one of the first and second drawing objects includes a drawing object related to map information. The first drawing picture and the second drawing picture are equal or different in size. The map display method includes the steps of (a) receiving input of user operation related to display of a drawing picture, (b) displaying the plurality of drawing pictures, and (c) prior to the step (b), controlling an overlapping state between the first drawing picture and a partial area in the second drawing picture in accordance with input of user operation received in the step (a), and masking the first drawing object with the second drawing object in the overlapped portion. This configuration enables map display of fine usability for a user.

The present invention has been described in detail. The above description merely exemplifies all aspects and the present invention is not to be limited thereto. Countless modification examples not mentioned herein are to be expected without being excluded from the scope of the present invention.

DESCRIPTION OF REFERENCE SIGNS

1: input/display unit, 2: first information storage, 3: second information storage, 4: controller, 401: input analyzer, 402: overall controller, 403: first information drawing unit, 404: first drawing picture holding unit, 405: second information drawing unit, 406: second drawing picture holding unit, 407: synthetic drawing unit, 408: synthetic drawing picture holding unit

The invention claimed is:

1. A map display device that displays a plurality of drawing pictures including a first drawing picture and a second drawing picture in an at least partially overlapping manner onto a display unit, wherein
said first drawing picture displaying at least one first drawing object,
said second drawing picture displaying at least one second drawing object,
at least one of said first and second drawing pictures including a drawing object that is a geographical map and at least one of said first and second drawing pictures being capable of displaying information other than the drawing object that is a geographical map, and
said first and second drawing pictures being equal or different in size,
the map display device comprising:
an input unit that receives input of user operation related to display of said second drawing picture; and
a controller configured to control display on the map display; said controller controlling an overlapping state between said first drawing picture and a partial area set with a predetermined rule in said second drawing picture in accordance with input of user operation received by said input unit, to allow the user to select the partial area set of said second drawing picture and then slide the selected partial area set of said second drawing picture away from the area of said first drawing picture it overlays to expose a portion of said first drawing picture and outputting, to the display unit, the picture in which said second drawing object masks said first drawing object in the portion where said first drawing picture and said partial area set in said second drawing picture are overlapped with each other
wherein said second drawing picture is divided into several partial area sets based on the predetermined rule;
wherein said partial area sets of said second drawing picture are defined by one or more prominent drawing features of said second drawing picture; and
wherein said one or more prominent drawing features are roads or water features.

2. The map display device of claim 1 wherein said partial area set of said second drawing picture is defined by a road or intersection of a route or possible route.

3. A map display device that displays a plurality of drawing pictures including a first drawing picture and a second drawing picture in an at least partially overlapping manner onto a display unit, wherein
said first drawing picture displaying at least one first drawing object,
said second drawing picture displaying at least one second drawing object,
at least one of said first and second drawing pictures including a drawing object related to map information but at least one of said first and second drawing pictures being capable of displaying information other than the drawing object related to map information, and
said first and second drawing pictures being equal or different in size,
the map display device comprising:
an input unit that receives input of user operation related to display said second drawing picture; and
a controller configured to
control display on the map display; said controller controlling an overlapping state between said first drawing picture and a partial area set with a predetermined rule in said second drawing picture in accordance with input the user operation received by said input unit and outputting, to the display unit, a picture in which said second drawing object masks said first drawing object in a portion where said first drawing picture and said partial area set in said second drawing picture are overlapped with each other; and
allow the user to select said partial area set of said second drawing picture defined by one or more prominent drawing features of said second drawing picture including a road or intersection of a route or possible route and then slide the selected said partial area set of said second drawing picture away from the area of the first drawing picture it overlays, to expose the portion of said first drawing picture wherein said second drawing picture is divided into several partial area sets based on the predetermined rule;
wherein said second drawing picture includes three dimensional drawing information with perspective display, said partial area set of said second drawing picture obscuring underlying information due to said perspective display until said slide is performed to expose the underlying information.

4. The map display device of claim 3 wherein said slide moves said partial area set of the second drawing picture without changing boundaries defined by the predetermined rule.

* * * * *